(12) United States Patent
Cao

(10) Patent No.: US 12,044,324 B2
(45) Date of Patent: Jul. 23, 2024

(54) PRESSURE RELIEF VALVE

(71) Applicant: Engineered Controls International, LLC, Elon, NC (US)

(72) Inventor: Guangbin Cao, Shanghai (CN)

(73) Assignee: Engineered Controls International, LLC, Elon, NC (US)

( * ) Notice: Subject to any disclaimer, the term of this patent is extended or adjusted under 35 U.S.C. 154(b) by 180 days.

(21) Appl. No.: 17/675,712

(22) PCT Filed: Aug. 29, 2019

(86) PCT No.: PCT/CN2019/103340
§ 371 (c)(1),
(2) Date: Feb. 18, 2022

(87) PCT Pub. No.: WO2021/035625
PCT Pub. Date: Mar. 4, 2021

(65) Prior Publication Data
US 2023/0349477 A1    Nov. 2, 2023

(51) Int. Cl.
*F16K 17/04* (2006.01)
*F16K 15/06* (2006.01)
*F16K 17/06* (2006.01)

(52) U.S. Cl.
CPC .......... *F16K 17/0466* (2013.01); *F16K 17/06* (2013.01); *F16K 15/063* (2013.01); *Y10T 137/7868* (2015.04); *Y10T 137/7929* (2015.04)

(58) Field of Classification Search
CPC ................. F16K 15/021; F16K 15/026; Y10T 137/7866; Y10T 137/7868;
(Continued)

(56) References Cited

U.S. PATENT DOCUMENTS 1,710,635 A * 4/1929 Wertz .................... F16K 15/026
                                                              137/220
2,005,931 A * 6/1935 Buttner .................. F16K 1/305
                                                              137/880
(Continued)

FOREIGN PATENT DOCUMENTS

| CN | 203836313 | 9/2014 |
| CN | 203892654 | 10/2014 |

(Continued)

OTHER PUBLICATIONS

Extended European Search Report and Opinion for PCT/CN2019/103340 dated Aug. 23, 2023, 8 pp.
(Continued)

*Primary Examiner* — Robert K Arundale
(74) *Attorney, Agent, or Firm* — Neal, Gerber & Eisenberg LLP

(57) ABSTRACT

A valve for conveying fluid has a closed position and an open position and comprises a body, a valve seat disposed in the body, a holder disposed in the body, and a valve seat disc. The valve seat comprises one or more inner surfaces and an outer surface, and the one or more inner surfaces define an inner void. The valve seat disc is connected to and movable with the holder between a first position in which the valve seat disc sealingly engages the outer surface of the valve seat and a second position in which the valve seat disc is disengaged from the outer surface of the valve seat. The valve is in the closed position when the valve seat disc is in the first position and the valve is in the open position when the valve seat disc is in the second position.

16 Claims, 15 Drawing Sheets

(58) Field of Classification Search
CPC ......... Y10T 137/7925; Y10T 137/7929; Y10T 137/7937
See application file for complete search history.

(56) References Cited

U.S. PATENT DOCUMENTS

| | | | | |
|---|---|---|---|---|
| 2,131,928 A * | 10/1938 | Abegg | ................... | F04B 53/102 137/902 |
| 2,254,209 A * | 9/1941 | Buttner | ................. | F16K 15/026 137/540 |
| 2,568,026 A * | 9/1951 | Pigott | ................. | F16K 17/0433 137/514.7 |
| 2,588,157 A * | 3/1952 | Olson | ...................... | F16K 17/06 137/516.29 |
| 2,601,563 A * | 6/1952 | Selwyn | ............... | F16K 17/0433 251/336 |
| 2,666,448 A * | 1/1954 | Garretson | .................. | F16K 1/34 301/5.1 |
| 2,670,922 A * | 3/1954 | Carlisle | ................. | F16K 15/026 137/540 |
| 2,683,464 A * | 7/1954 | St Clair | .............. | F16K 17/0466 137/540 |
| 2,868,460 A * | 1/1959 | Hansen | ................ | G05D 23/023 137/540 |
| 3,025,874 A * | 3/1962 | Yocum | ...................... | F16K 1/36 137/540 |
| 3,232,314 A * | 2/1966 | Koester | ............... | F16K 17/0446 251/332 |
| 3,605,802 A * | 9/1971 | Hertell | ................ | F16K 47/0111 137/516.29 |
| 3,782,412 A * | 1/1974 | Darash | .................. | F16K 15/063 137/540 |
| 3,911,950 A * | 10/1975 | Lowe | ................... | F16K 17/0466 137/543.17 |
| 4,049,017 A * | 9/1977 | Jones | ...................... | F16K 47/04 137/543.17 |
| 4,140,148 A * | 2/1979 | Richter | ............... | F16K 17/0466 220/203.27 |
| 4,450,859 A * | 5/1984 | Bergman | .................. | F16K 1/36 251/84 |
| 4,520,843 A | 6/1985 | Debrunner, Jr. | | |
| 4,766,924 A * | 8/1988 | Lee, III | ................. | F16K 15/063 137/540 |
| 5,090,446 A * | 2/1992 | Hunter | ................... | F16K 15/026 137/540 |
| 6,953,053 B2 | 10/2005 | Waffler et al. | | |
| 2003/0047216 A1 | 3/2003 | Kelly | | |
| 2005/0217731 A1 * | 10/2005 | Abe | ........................ | F16K 17/06 137/540 |

FOREIGN PATENT DOCUMENTS

CN 104019258 8/2016
WO WO 2002046651 6/2002

OTHER PUBLICATIONS

International Search Report and Written Opinion for PCT/CN2019/103340 dated Mar. 25, 2020, 10 pp.

* cited by examiner

PRESSURE RELIEF VALVE

CROSS-REFERENCE

This application is a national stage entry of International Patent Application No. PCT/CN2019/103340 filed on Aug. 29, 2019, the entire contents of which are incorporated herein by reference.

TECHNICAL FIELD

This disclosure generally relates to a pressure-relief valve for venting fluid from a pressurized vessel (e.g., a tank or conduit) to ambient atmosphere.

BACKGROUND

Pressure-relief valves expel or vent fluid (e.g., vapor/gas phase fluid) from a pressurized vessel to ambient atmosphere. Venting is desirable when a pressure of fluid in the vessel exceeds a threshold. Venting reduces the pressure of the fluid in the vessel below the threshold. For example, a tank may hold a fluid such as compressed natural gas, liquefied natural gas, liquefied nitrogen, etc. The tank may be configured to withstand a maximum pressure. At some point, the fluid may warm, thus increasing pressure in the tank above the maximum pressure.

A pressure-relief valve may be connected to and in fluid communication with the tank. The pressure-relief valve would vent the compressed gas out of the tank to ambient atmosphere until the pressure of the compressed natural gas fell below the maximum pressure. Exemplary pressure-relief valves are disclosed in U.S. Pat. No. 9,939,072 to Wyatt and Publication No. WO 2016/044398 to Wyatt, which are hereby incorporated by reference in their entirety.

SUMMARY

Existing pressure-relief valves often experience various challenges. For example, existing pressure-relief valves may experience collection of particulates like dust and dirt on their valve seats, which may result from contaminated media and/or improper valve cleaning. This collection of particulates impairs sealing quality between the valve seats and the valve members that compress against the valve seats. If the seal quality is sufficiently impaired, fluid may leak through the pressure-relief valves thus generating air pollution and wasting fluid.

Existing pressure-relief valves may experience collisions between their valve members and their outer valve bodies. These collisions generate an annoying rattling noise and may erode the valve members and the outer valve bodies.

Existing pressure-relief valves may also experience impaired or reduced sealing quality at lower (e.g., cryogenic) temperatures. Outer surfaces of the valve members compress against inner surfaces of the valve bodies to generate seals. Under cryogenic temperatures, the valve members may experience greater shrinkage than the valve bodies, thereby degrading the valve sealing qualities.

This application discloses many embodiments of a valve and many embodiments of components for a valve. At least some of these embodiments resolve, or at least partially resolve, one or more of the above challenges.

One embodiment of a valve of the present disclosure for conveying fluid has a closed position and an open position and comprises a body, a valve seat disposed in the body, a holder disposed in the body, and a valve seat disc. The valve seat comprises one or more inner surfaces and an outer surface, and the one or more inner surfaces define an inner void. The valve seat disc is connected to and movable with the holder between a first position in which the valve seat disc sealingly engages the outer surface of the valve seat and a second position in which the valve seat disc is disengaged from the outer surface of the valve seat. The valve is in the closed position when the valve seat disc is in the first position and the valve is in the open position when the valve seat disc is in the second position.

This application is defined by the appended claims. The description summarizes aspects of exemplary embodiments and should not be used to limit the claims. Other implementations are contemplated in accordance with the techniques described herein, as will be apparent upon examination of the following drawings and detailed description, and such implementations are intended to be within the scope of this application.

DETAILED DESCRIPTION

Figure 1A:
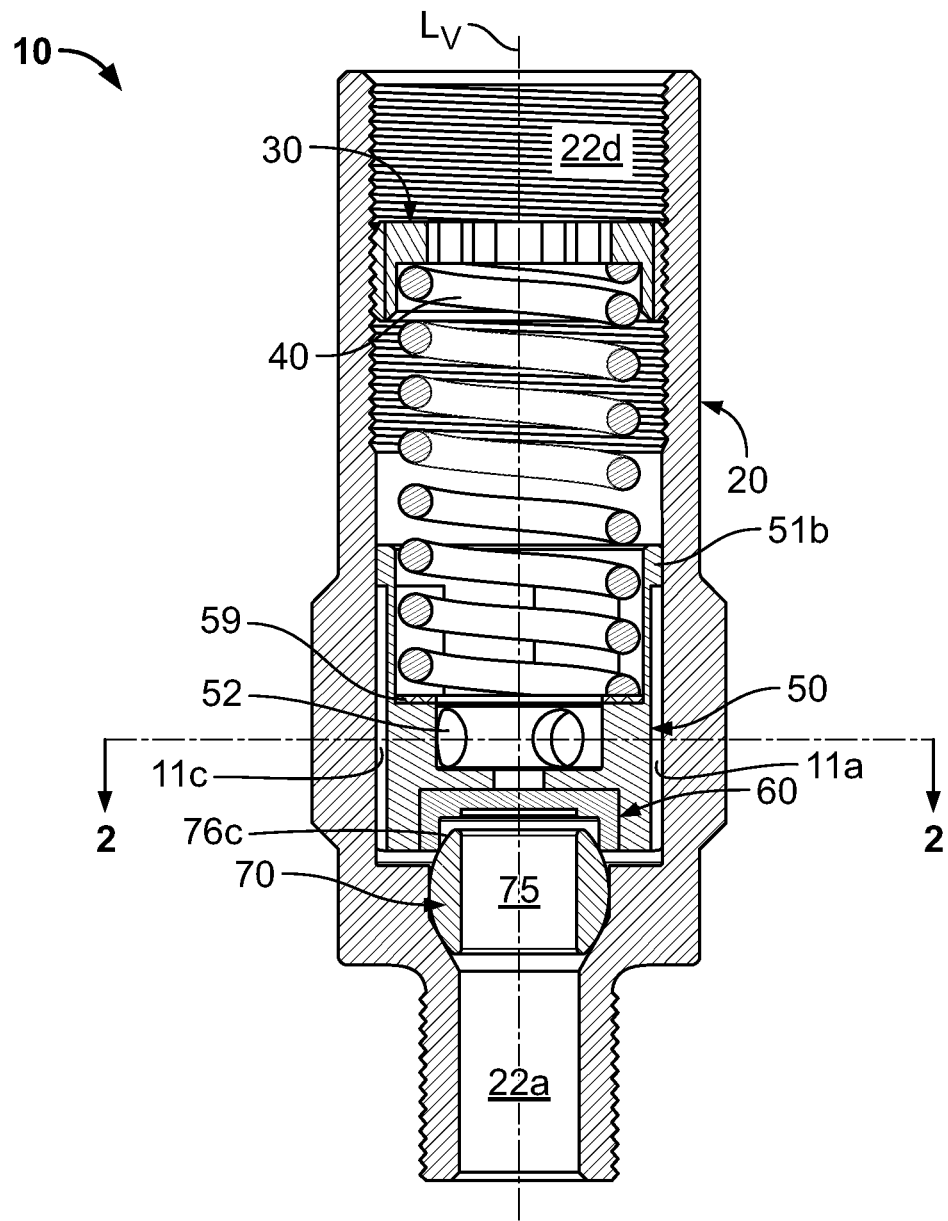
FIG. 1A is a cross-sectional side view of one embodiment of the pressure-relief valve of the present disclosure taken along line 1-1 of FIG. 2, showing the pressure-relief valve in the closed configuration.

The description that follows describes, illustrates and exemplifies one or more embodiments of the present invention in accordance with its principles. This description is not provided to limit the invention to the embodiments described herein, but rather to explain and teach the principles of the invention in order to enable one of ordinary skill in the art to understand these principles and, with that understanding, be able to apply them to practice not only the embodiments described herein, but also other embodiments that may come to mind in accordance with these principles. The scope of the present invention is intended to cover all such embodiments that may fall within the scope of the appended claims, either literally or under the doctrine of equivalents. The specification describes exemplary embodiments which are not intended to limit the claims or the claimed inventions. Features described in the specification, but not recited in the claims, are not intended to limit the claims.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose.

Some features may be described using relative terms such as top, bottom, vertical, rightward, leftward, etc. These relative terms are only for reference with respect to the appended Figures. These relative terms are not meant to limit the disclosed embodiments. More specifically, it is contemplated that the valves depicted in the appended Figures will be oriented in various directions in practice and that the relative orientation of features will change accordingly.

As stated above, the present specification is intended to be taken as a whole and interpreted in accordance with the principles of the present invention as taught herein and understood by one of ordinary skill in the art.

FIGS. 1A-11 illustrate one embodiment of the pressure-relief valve of the present disclosure, identified as the pressure-relief valve 10. The pressure-relief valve 10 includes a body 20, a set screw 30, a spring 40, a piston 50, a washer 59, a seat disc 60, and a valve seat 70.

Figure 3:
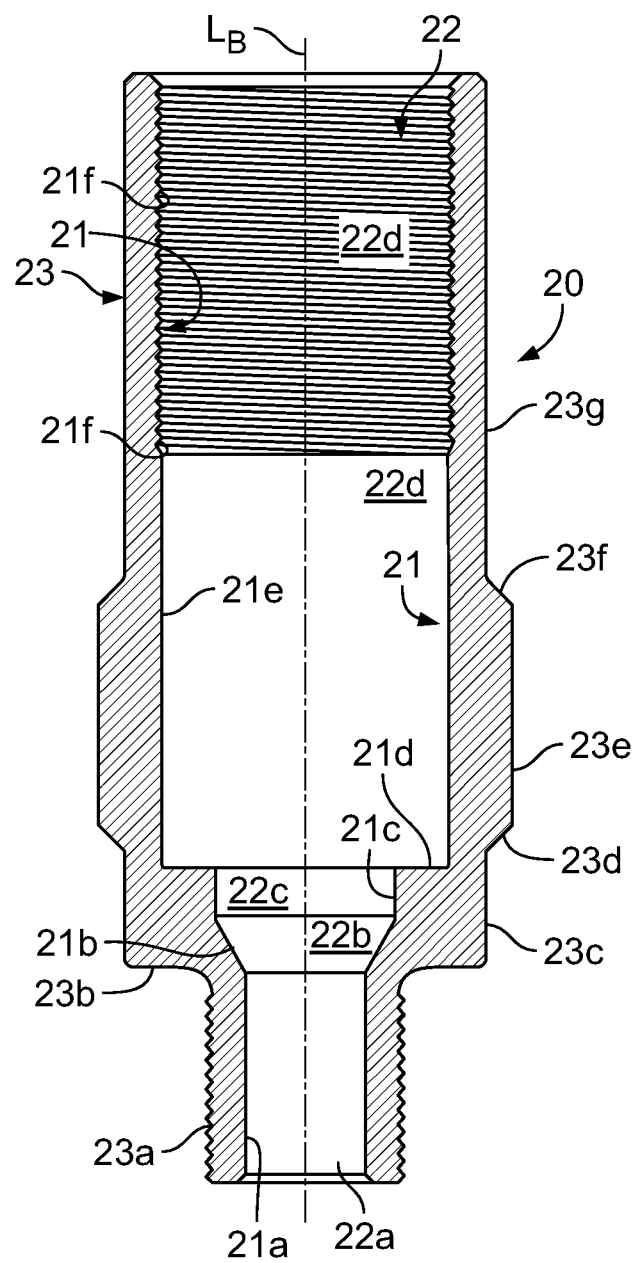
FIG. 3 is a cross-sectional side view of a body of the pressure-relief valve of FIG. 1A.

As best shown in FIGS. 1A and 3, the body 20 houses the set screw 30, the spring 40, the piston 50, the washer 59, the seat disc 60, and the valve seat 70. The body 20 has a longitudinal axis $L_B$ and includes multiple inner surfaces 21 defining multiple voids 22. The body 20 also includes multiple outer surfaces 23.

A first inner surface 21a of the body 20 is parallel to the longitudinal axis $L_B$ and defines a cylindrical inlet (or first) void 22a. A second inner surface 21b of the body 20 is sloped with respect to the longitudinal axis $L_B$ and defines a frustoconical second void 22b. A third inner surface 21c of the body 20 is parallel to the longitudinal axis $L_B$ and defines a cylindrical third void 22c. A fourth inner surface 21d of the body 20 perpendicularly joins the third inner surface 21c with a fifth inner surface 21e of the body 20. The fifth inner surface 21e is parallel to the longitudinal axis $L_B$. A sixth inner surface 21f of the body 20 is threaded but is otherwise similar to the fifth inner surface 21e. The fourth, fifth, and sixth inner surfaces 21d, 21e, and 21f collectively define a cylindrical outlet (or fourth) void 22d.

A first outer surface 23a of the body 20 is threaded but otherwise parallel to the longitudinal axis $L_B$. A second outer surface 23b of the body 20 perpendicularly joins the first outer surface 23a with a third outer surface 23c of the body 20. In the illustrated example, a radius defined between the first outer surface 23a and the second outer surface 23b provides a smooth transition between the first and second outer surfaces 23a and 23b. The third outer surface 23c is parallel to the longitudinal axis $L_B$. A fourth outer surface 23d of the body 20 slopes at an angle (e.g., 45 degrees) with respect to the longitudinal axis $L_B$. A fifth outer surface 23e of the body 20 is parallel to the longitudinal axis $L_B$. A sixth outer surface 23f of the body 20 slopes at an angle (e.g., 45 degrees) with respect to the longitudinal axis $L_B$. A seventh outer surface 23g of the body 20 is parallel to the longitudinal axis $L_B$.

The first outer surface 23a is configured to threadably engage corresponding threads of a vessel (not shown) to removably attach the body 20 (and therefore the valve 10) to the vessel. The sixth inner surface 21f is configured to threadably engage corresponding threads of the set screw 30. During manufacture, precise adjustment of the set screw 30 sets or otherwise defines a desired threshold pressure setting for opening and/or closing the valve 10. Once the threshold pressure is set, the set screw 30 is pinned or otherwise fixed in place to prevent unauthorized adjustment of the threshold pressure setting of the valve 10.

Figure 4:
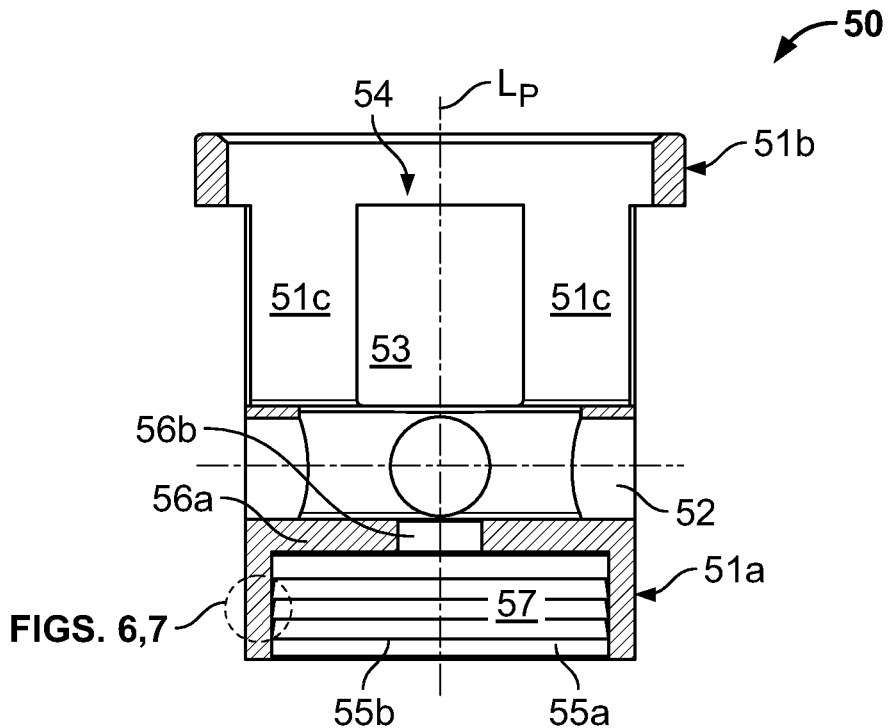
FIG. 4 is a cross-sectional side view of a piston of the pressure-relief valve of FIG. 1A taken along line 4-4 of FIG. 5.
Figure 5:
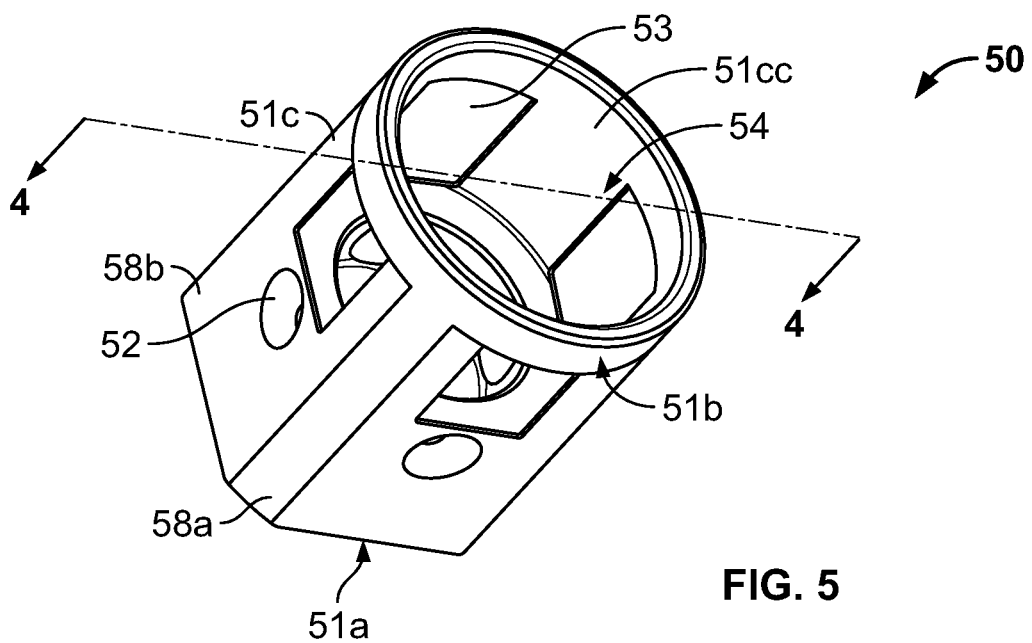
FIG. 5 is an isometric view of the piston of FIG. 4.

As best shown in FIGS. 4 and 5, the piston 50 (sometimes called the "holder") includes a receiver 51a and a guide 51b. The receiver 51a includes a generally box-shaped exterior formed from four body-guide surfaces 58a and four connecting surfaces 58b. Each connecting surface 58b extends between two different body-guide surfaces 58a. The receiver 51a is configured to receive the seat disc 60, receive pressurized fluid when the valve 10 is in the open configuration, and receive the spring 40. The guide 51b is generally annular. The piston 50 is preferably symmetrical about a plane extending through opposing body-guide surfaces 58a.

As shown in FIG. 1, a washer 59 is positioned above the receiver 51a (with respect to the orientation shown in FIG. 1) and directly contacts a lower end of the spring 40. When the washer 59 is absent, the receiver 51a may directly contact the lower end of the spring 40. When the washer 59 is present, the receiver 51a may indirectly contact the lower end of the spring 40 via the washer 59.

In this embodiment, as best shown in FIG. 5, the body-guide surfaces 58a have a radius of curvature equal to a radius of curvature of a cylindrical outer surface of the guide 51b. The body-guide surfaces 58a are flush with the cylindrical outer surface of the guide 51b and configured to guide piston 50 movement within the body 20. The guide 51b radially protrudes with respect to the connecting surfaces 58b extending between adjacent body-guide surfaces 58a.

Figure 1B:
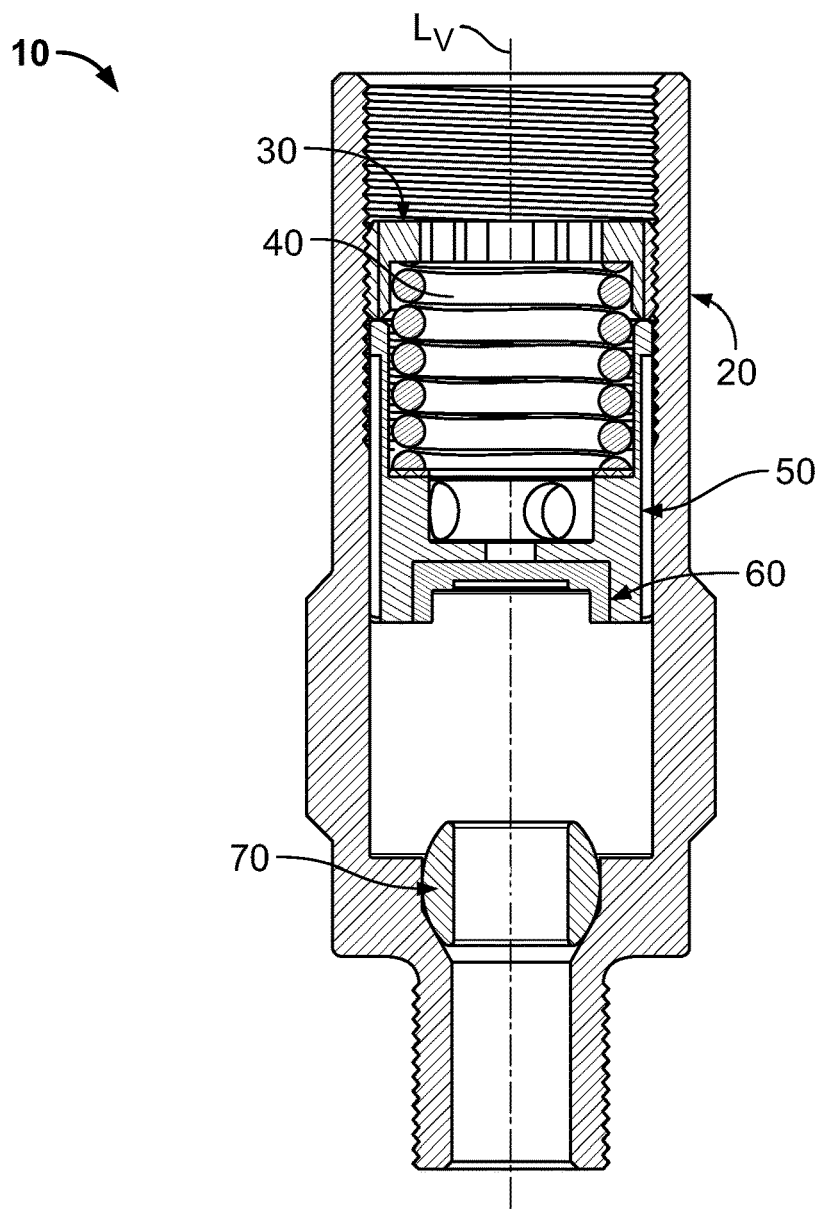
FIG. 1B is a cross-sectional side view of the pressure-relief valve of FIG. 1A, showing the pressure-relief valve in the open configuration.

The piston 50 is sized and shaped to be received in the void 22d formed in the body 20. When the piston 50 is received in the body 20, the body-guide surfaces 58a of the receiver 51a position the piston 50 within the body 20 to define a small clearance between the piston 50 and the inner wall 21e of the body 20. This clearance between the piston 50 and inner wall 21e forms multiple partially cylindrical gaps 11a, 11b, 11c, and 11d between the body-guide surfaces 58a and the fifth surface 21e of the body 20. As shown in FIGS. 1A and 1B, the cylindrical outer surface of the guide 51b defines a small clearance between the guide 51b and the inner wall 21e.

The presence of the gaps 11a-11d between the body 20 and the piston 50 advantageously discourages foreign particles (e.g., dust) from accumulating on the inner surface 21e of the body 20 and thus obstructing longitudinal movement of the piston 50. More specifically, the presence of the gaps 11a-11d encourages particles entering the valve 10 via the valve outlet 22d to fall downward through the gaps 11a-11d and past the inner surface 21e, until reaching the fourth inner surface 21d of the body 20. Additionally, the gaps 11a-11d advantageously allow debris from the pressurized vessel (e.g., storage tank) to flow through the valve 10 instead of accumulating within the body 20.

Additionally, the guide 51b and the body-guide surfaces 58a are configured to align the piston 50 with respect to the body 20 by circumferentially guiding the piston 50 adjacently along the fifth inner surface 21e of the body 20. By aligning the piston 50 with respect to the body 20, the guide 51b and the body-guide surfaces 58a align the spring 40 with respect to the body 20 and the seat disc 60 with respect to the valve seat 70. Further, this alignment and guidance between the inner surface 21e of the body 20, the body-guide surfaces 58a, and the cylindrical outer surface of the guide 51b discourage the piston 50 from shaking and rattling inside the body 20. According to some embodiments, the piston 50 is configured to be adjacently positioned with respect to the body 20 (via the guide 51b and/or the body-guide surfaces 58a) along an entire longitudinal length of the piston 50 to prevent any other portion of the piston 50 from radially colliding with the body 20.

In another embodiment, the body-guide surfaces are not flush with the cylindrical outer surface of the guide. According to such an embodiment, a maximum effective diameter of the receiver (i.e. between opposing body-guide surfaces or between opposing connecting surfaces) is less than a maximum diameter of the guide such that the guide radially outwardly protrudes with respect to both the connecting surfaces and body-guide surfaces. In this embodiment, the cylindrical outer surface of the guide contacts the body when the piston is received in the body, but the body-guide surfaces do not.

Figure 6:
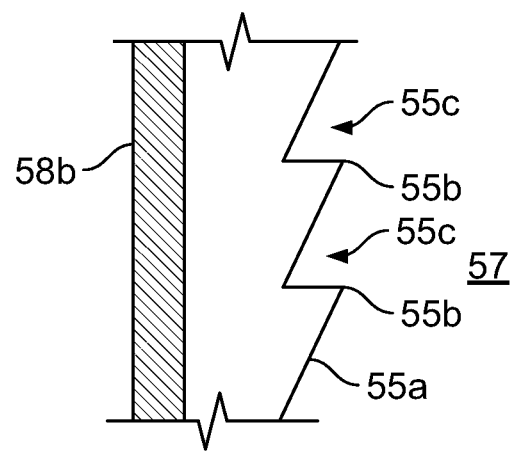
FIG. 6 is a fragmentary cross-sectional side view of the piston of FIG. 4.
Figure 7:
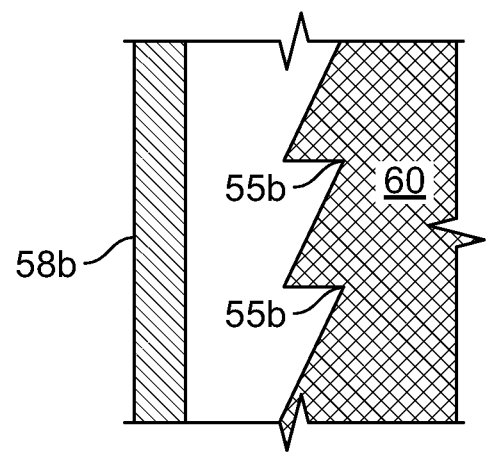
FIG. 7 is a fragmentary cross-sectional side view of the piston of FIG. 4 in which a seat disc of the pressure-relief valve of FIG. 1A is received.

Returning to the illustrated embodiment, as best shown in FIGS. 4 and 5, the receiver 51a includes a radially inwardly extending circumferential ring 56a defining a central void 56b. Below the circumferential ring 56a (with respect to the orientation shown in FIGS. 4 and 5), the receiver 51a defines a cylindrical seat disc void 57 and includes a plurality of undercuts 55c. As best shown in FIGS. 6 and 7, the undercuts 55c form in a plurality of upwardly angled surfaces 55a having upwardly extending edges or tips 55b. The upwardly extending edges or tips 55b deform and grip the seat disc 60 to prevent the seat disc 60 from moving with respect to the piston 50. The upwardly extending surfaces 55a and the upwardly extending edges or tips 55b may extend about the circumference of the cylindrical seat disc void 57.

FIG. 6 is a schematic side plan view of one partial slice of receiver 51a cut along a plane perpendicular to one of the connecting surfaces 58b. In FIG. 6, the seat disc 60 is removed for clarity. As shown in FIG. 6, the undercuts 55c result in the edges or tips 55b that are configured to grip and deform an outer surface of the seat disc 60. FIG. 7 adds the seat disc 60 to FIG. 6. In FIG. 7, it can be seen that the tips 55b deform and thus grip an outer surface of the seat disc 60. The seat disc 60 at least partially occupies or fully occupies the voids defined by the undercuts 55c.

As best shown in FIGS. 4 and 5, the receiver 51a defines four cylindrical first openings 52, four rectangular second openings 53, and a cylindrical central opening 54. Posts 51c, which include portions of the body-guide surfaces 58a and portions of the connecting surfaces 58b, extend between the second openings 53. Each inner surface has a radius of curvature equal to a radius of curvature of the central opening 54 so that an inner reference circumference of the receiver 51a is flush with the inner surfaces 51cc of the posts 51c.

The central opening 54 is in fluid communication with the first openings 52 and the second openings 53. When the valve 10 is in the open configuration, fluid passes between the piston 50 and the body 20 and into the piston 50 via the first openings 52 and/or the second openings 53 (as described below). The second openings 53 have a greater surface area than the first openings 52 and thus the second openings 53 accommodate a greater volume of fluid flow in the absence of the spring 40. But as shown in FIG. 1, the spring 40 at least partially obstructs the second openings 53. As the spring 40 compresses (i.e., as the piston 50 moves upward relative to the body 20), the spring 40 obstructs the second openings 53 to a greater extent such that the flow of fluid through the second openings 53 decreases. Upon sufficient compression of the spring 40, the first openings 52 may accommodate a greater volume of fluid flow than the second openings 53.

Figure 8:
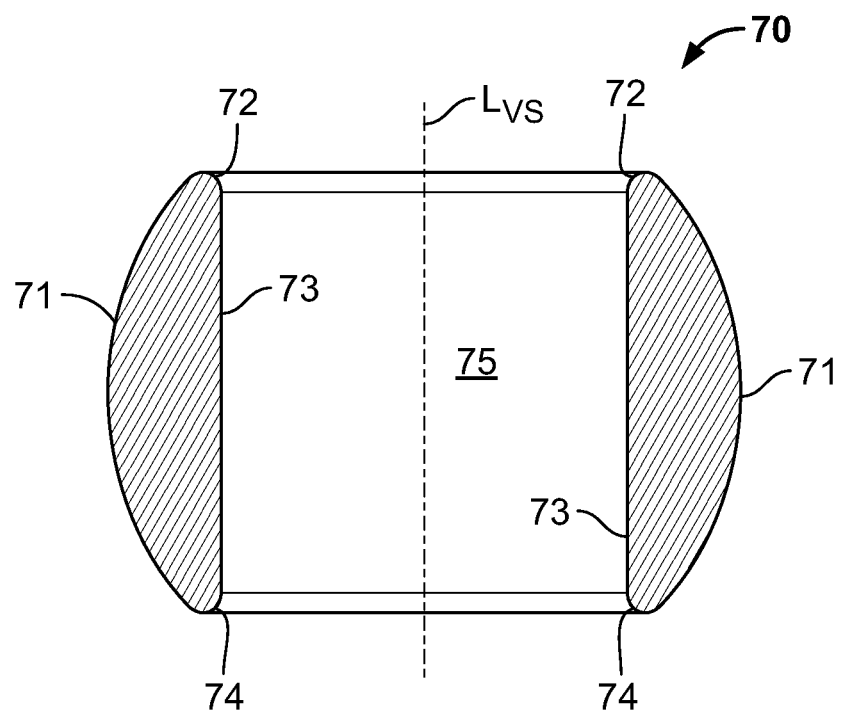
FIG. 8 is a cross-sectional side view of a valve seat of the pressure-relief valve of FIG. 1A taken along line 8-8 of FIG. 9.
Figure 9:
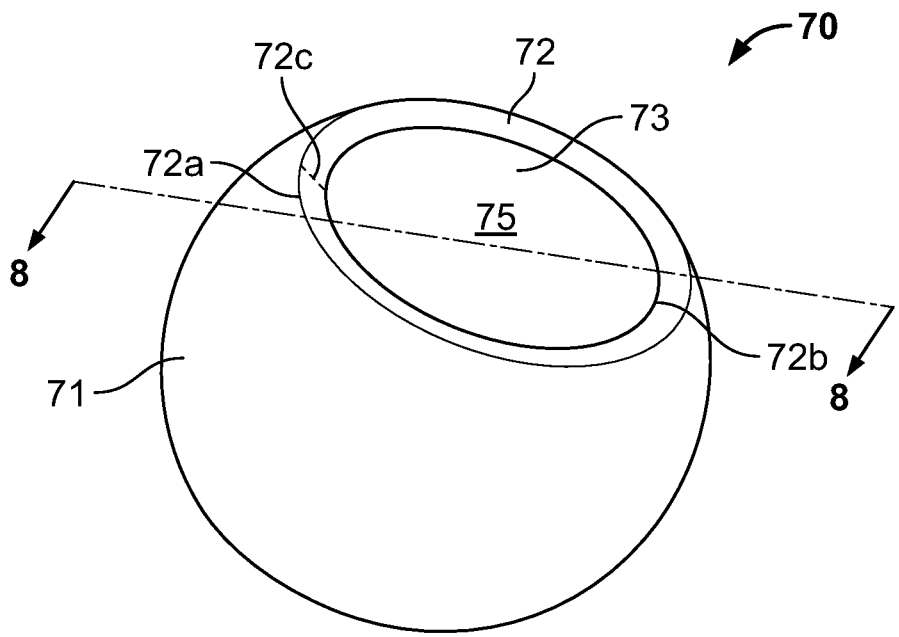
FIG. 9 is an isometric view of the valve seat of FIG. 8.

As best shown in FIGS. 8 and 9, the valve seat 70 is partially spherical and symmetrical about its longitudinal axis $L_{VS}$, which may be collinear with the longitudinal axis $L_B$ of the body 20. The valve seat 70 includes an outer surface 71 (also called valve seating surface, or the at least one valve seating surface), a first ledge 72, a second opposing ledge 74, and an inner surface 73. The inner surface 73 defines a cylindrical valve seat void 75. According to some embodiments, The outer surface 71 is curved such that the valve seat 70 is shaped like a partial sphere (e.g., a sphere with two opposing ends removed, as shown in FIG. 8).

The first and second ledges 72 and 74 in some embodiments have identical radii of curvature. The first and second ledges 72 and 74 may be identical such that the valve seat 70 is symmetrical about a plane extending through a midpoint of the outer surface 71 and perpendicular to the longitudinal axis $L_{VS}$. As best shown in FIG. 9, the first ledge 72 may define a first circumferential edge 72a with the outer surface 71 and a second circumferential edge 72b with the inner surface 73. A reference segment 72c flush with the first ledge 72 and connecting the first circumferential edge 72a with the second circumferential edge 72b may be flat (e.g., linear) or arced. In FIG. 8, the reference segment 72c is arced with a radius of curvature.

The outer surface 71 and/or the inner surface 73 is/are a smooth or excellent surface finish (e.g., polish). The outer surface 71 and/or the inner surface 73 has/have a more smooth or excellent surface finish than the inner surface 21 of the body 20, including the inner surfaces 21b and 21c. The difference in surface finishes enables rough inner surfaces of the body 20 to grip the smooth outer surface 71 of the valve seat 70. Further, the smooth outer surface 71 of the valve seat 70 discourages particles (e.g., dust) from accumulating on the outer surface 71 and disrupting seal quality between the seat disc 60 and the valve seat 70. Because the valve seat 70 may be machined separately from the body 20, a user can polish the outer surface 71 to include a desired surface finish before inserting the valve seat 70 into the body 20. Thus, this desired surface finish of the outer surface 71 may be configured to provide a desired amount of sealing between the valve seat 70 and the seat disc 60.

Figure 10:
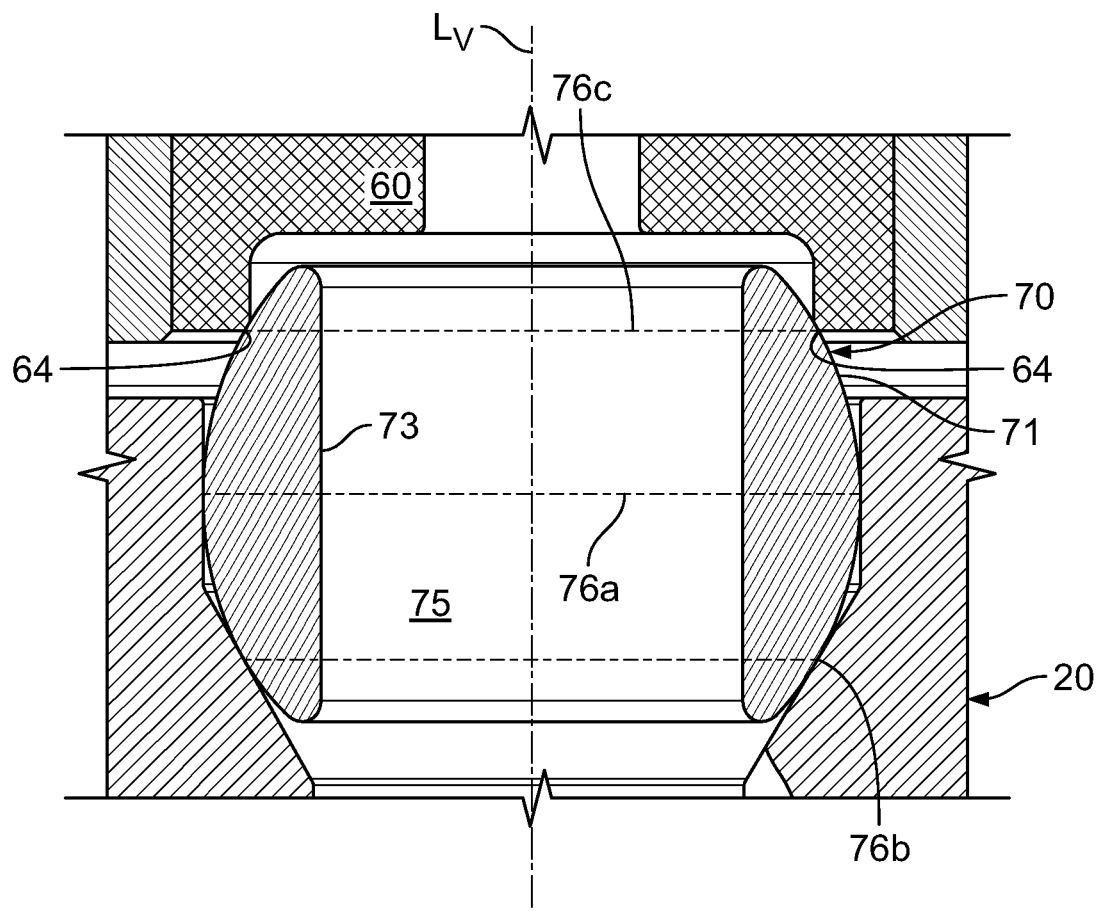
FIG. 10 is a fragmentary cross-sectional side view of the pressure-relief valve of FIG. 1A showing the valve seat, a portion of the body, and a portion of the seat disc taken along line 1-1 of FIG. 2.

As best shown in FIGS. 1 and 10, the valve seat 70 is sized and shaped for an interference fit with the body 20. In the illustrated embodiment, the valve seat 70 contacts the body 20 along a first circumference 76a and a second circumference 76b. Thus, the valve seat 70 is dimensioned such that a diameter of the first circumference 76a is greater than a diameter of the void 22c of the body 20 and a diameter of the second circumference 76b is greater than a corresponding diameter of part of the void 22b of the body 20.

In the illustrated embodiment, the body 20 is preferably made from a first material (e.g., brass), and the valve seat 70 is preferably made from a different second material (e.g., stainless steel). The first material preferably has a greater coefficient of thermal expansion than the second material, such that when the valve 10 is subject to cryogenic temperatures (e.g., 123 K or −150 C), the body 20 contracts to a greater extent than does the valve seat 70. Such differential contraction improves the interference fit between the body 20 and the valve seat 70 such that at cryogenic temperatures, compressive forces exerted by the body 20 against the valve seat 70 increase as compared with room temperatures (e.g., 294 K or 21 C). Thus, when the valve 10 is subject to cryogenic temperatures, the seals between the body 20 and the valve seat 70 along the first and second circumferences 76a and 76b improve. As with all features disclosed herein, brass and stainless steel are optional materials for the body 20 and valve seat 70, and other materials may be used.

Figure 11:
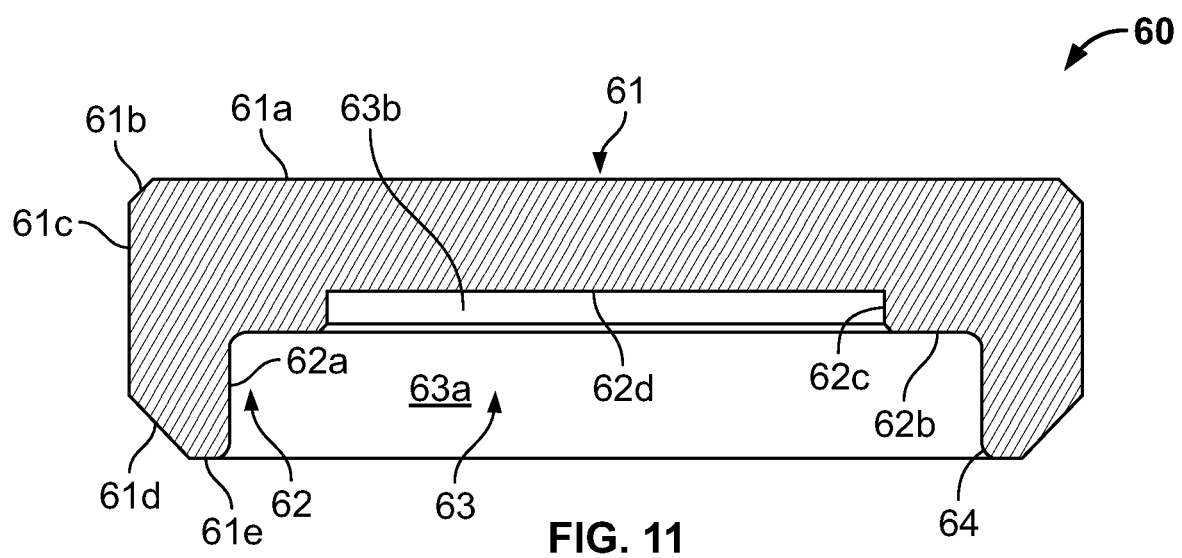
FIG. 11 is a cross-sectional side view of the seat disc of the pressure-relief valve of FIG. 1A.

Turning to FIG. 11, the seat disc 60 includes an outer surface 61 and an inner surface 62, and defines a void 63. The seat disc 60 is bowl-shaped and is symmetrical about its longitudinal axis. The seat disc 60 is configured to close the valve 10 by compressing and sealing against the valve seat 70.

The outer surface 61 includes a flat and circular first surface 61a, a linearly sloped and annular second surface 61b, a flat and cylindrical third surface 61c, a linearly sloped and annular fourth surface 61d, and a flat and annular fifth surface 61e.

The inner surface 62 includes a cylindrical first surface 62a, a flat and annular second surface 62b, a flat and cylindrical third surface 62c, and a flat and circular fourth surface 62d. The inner surface 62 includes a circumferential and curved sealing surface 64 linking the fifth outer surface 61e and the first inner surface 62a. The sealing surface 64 is configured to compress against the valve seat 70. More specifically, at least a portion of sealing surface 64 sealingly engages the valve seat 70 along a circumference 76c when valve 10 is closed, as shown in FIG. 10.

More specifically, the piston 50 and attached seat disc 60 are movable between a sealed position (e.g., closed position) and an unsealed position (e.g., open position). When the piston 50 and attached seat disc 60 are in the sealed position, the sealing surface 64 of the seat disc 60 sealingly engages the valve seat 70 to prevent fluid from flowing through the valve 10 from the inlet void 22a to the outlet void 22d and the valve 10 therefore is closed. On the other hand, when the piston 50 and attached seat disc 60 are in the unsealed position, the sealing surface 64 of the seat disc 60 is displaced from—and does not sealingly engage—the valve seat 70, meaning that fluid can flow through the valve 10 from the inlet void 22a to the outlet void 22d. The spring 40 biases the piston 50 and the seat disc 60 to the sealed position, and the valve 10 is therefore biased in the closed and/or sealed position.

The piston and attached seat disc in certain embodiments have multiple sealed and unsealed positions. The unsealed positions correspond to positions of the piston and seat disc when the seat disc is disengaged from the valve seat while the sealed positions correspond to positions of the piston and seat disc when the seat disc sealingly engages the valve seat.

The longitudinal axes of some components (e.g., the longitudinal axes of the piston 50 and the seat disc 60) may become slightly misaligned (e.g., at a 1 degree angle or at less than a 1.5 degree angle) with respect to the longitudinal axis $L_B$ of the body 20 in use. As such, the circumference 76c may not be completely perpendicular to the longitudinal axis $L_B$. Because the sealing surface 64 inwardly bears on the valve seat 70, such misalignment does not necessarily impair the quality of the seal between the seat disc 60 and the valve seat 70. In other words, a 360 degree seal is maintained about the valve seat 70 even when these longitudinal axes are misaligned.

This stands in contrast to prior art designs in which a seat disc outwardly bears on an inner surface of a valve seat. In these prior art designs, misalignment between the longitudinal axes of the seat disc and the valve seat introduces leakage between the seat disc and the valve seat. Put differently, when a seat disc outwardly bears on a valve seat, misalignment of the seat disc with respect to the valve seat will cause at least a portion of the seat disc to no longer contact the valve seat and a 360 degree seal will not be maintained.

The void 63 includes a cylindrical first void 63a with a diameter defined by the first inner surface 62a and a cylindrical second void 63b with a diameter defined by the third inner surface 62c. The diameter of the first void 63a exceeds the diameter of the second void 63b. A length (in the longitudinal direction) of the first void 63a exceeds a length (in the longitudinal direction) of the second void 63b.

The valve seat 70 may be made from the second material (e.g., stainless steel) and the seat disc 60 may be made from a different third material (e.g., a polymer such as a rubber or plastic). This third material is preferably compressible and has a greater coefficient of thermal expansion than the second material such that when the valve 10 is subject to cryogenic temperatures, the seat disc 60 contracts to a greater extent than the valve seat 70. Such differential contraction improves seal quality (i.e., tightness or compression of the seal along the third circumference 76c and the sealing surface 64). Thus, when the valve 10 is subject to cryogenic temperatures and closed, the seal between the seat disc 60 and the valve seat 70 improves. Put differently, contraction of the seat disc 60 with respect to the valve seat 70 improves seal quality.

In operation, the valve 10 is attached to a pressurized vessel (e.g., a tank or conduit, not shown) storing a pressurized fluid via the threading on the first outer surface 23a of the body 20 such that the inlet void 22a is in constant fluid communication with the pressurized vessel. The pressurized fluid may be stored in the vessel at cryogenic temperatures. The outlet void 22d is configured to be in constant fluid communication with ambient atmosphere.

The inlet void 22a is in constant fluid communication with the valve seat void 75. Pressurized fluid in valve seat void 75 acts against the biasing force the spring 40 imposes against the piston 50 and the seat disc 60. When the pressurized fluid in the vessel exceeds a threshold pressure, and specifically when the force the pressurized fluid imposes on the seat disc 60 exceeds the biasing force of the spring 40, the seat disc 60 disengages the valve seat 70, i.e., moves from the sealed position to the unsealed position. This opens the valve 10 and enables fluid to flow from valve seat void 75 through the gaps 11a-11d between the body 20 and the piston 50, into the piston 50 via the first openings 52 and the second openings 53, and through an opening in the set screw 30 into the outlet void 22d and then to ambient atmosphere.

Upon sufficient fluid venting, the force the pressurized fluid imposes on the seat disc 60 falls below the biasing force imposed by the spring 40. As a result, the spring 40 forces the piston 50 and attached seat disc 60 from the unsealed position to the sealed position, thereby closing valve 10.

This section lists some advantages of disclosed embodiments. Additional advantages of the disclosed embodiments should be apparent from reading the other sections of the specification.

The bowl-shaped design of the seat disc 60 enables the seat disc 60 to absorb impact of foreign particles when the valve 10 is open. More specifically, the first, second, third and fourth inner surfaces 62a, 62b, 62c, and 62d of the seat disc 60 are configured to absorb impact of foreign particles (e.g., dust) when the valve 10 is open. The momentum of foreign particles causes the foreign particles to collide with the inner surface 62 of the seat disc 60 while fluid vents past the sealing surface 64 and the outer surface 61 when the valve 10 is open.

Figure 2:
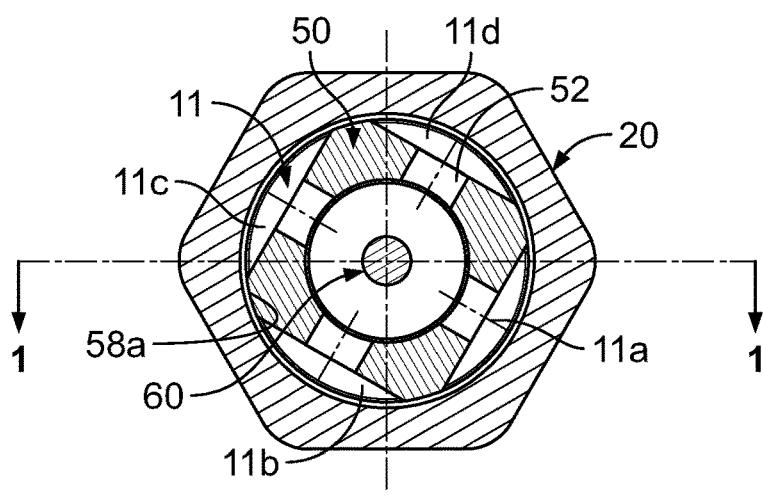
FIG. 2 is a cross-sectional top view of the pressure-relief valve of FIG. 1 taken along line 2-2 of FIG. 1A.

Additionally, the bowl-shaped design of the seat disc 60 and/or an outer diameter of the receiver 51a enables the seat disc 60 and/or the receiver 51a to deflect foreign particles from the valve seat 70 (e.g., the third circumference 76c of the valve seat 70) when the valve 10 is closed. More specifically, when the valve 10 is closed, these particles may enter the valve 10 through the outlet void 22d and fall under force of gravity toward the piston 50 and the seat disc 60. These particles may eventually enter one or more of the gaps 11a-11d and fall under force of gravity toward the surface 21d of the body 20. Because the piston 50 and the seat disc 60 both vertically and circumferentially surround or cover the valve seat 70, foreign particles will not contact the valve seat 70, and especially the third circumference 76c of the valve seat 70. With reference to FIG. 2, it can be seen that the gaps 11a-11d defined between the body 20 and the piston 50 are offset from the valve seat 70, such that no longitudinally extending reference line through the gaps 11a-11d intersects the valve seat 70.

Furthermore, the surface 21d of the body 20 is flat and horizontal to longitudinal axis $L_B$ (and according to some embodiments, inclined outwardly downward) such that particles resting on the surface 21d do not experience gravitational force drawing the particles toward the valve seat 70 when the longitudinal axis $L_V$ of the valve 10 (which may be collinear with longitudinal axis $L_B$) is oriented parallel to the vertical direction. Put differently, the surface 21d of the body 20 is not inclined (with respect to the longitudinal) toward the valve seat 70 and the surface 21d of the body 20 is configured to oppose gravitational force on and thereby arrest downward movement of particles encountering the surface 21d. The surface 21d of body therefore serves as a resting surface or trap for foreign particles. Even if particles encountering the surface 21d moved radially inward toward the valve seat 70, the third circumference 76c of the valve seat 70 is located vertically above the surface 21d such that particles would have to oppose force of gravity and move longitudinally upward to reach the third circumference 76c.

As stated above, according to some embodiments, the body 20, the valve seat 70, and the seat disc 60 are each symmetrical about their respective longitudinal axes. According to some embodiments, a total surface area of the gaps 11a-11d is greater than or equal to a total surface area of the valve seat void 75. According to some embodiments, a total surface area of the first openings 52 plus the second openings 53 is greater than or equal to a total surface area of the valve seat void 75. According to some embodiments, a surface area of the central void defined by the spring 40 is greater than or equal to a total surface area of the valve seat void 75. The surface areas are taken along planes perpendicular to the intended flow direction of fluid.

FIGS. 12A-20 illustrate another embodiment of the pressure-relief valve of the present disclosure, identified as the pressure-relief valve 100. The pressure-relief valve 100 includes a body 200, a set screw 300, a spring 400, a piston 500, a seat disc 600, and a valve seat 700.

Figure 12A:
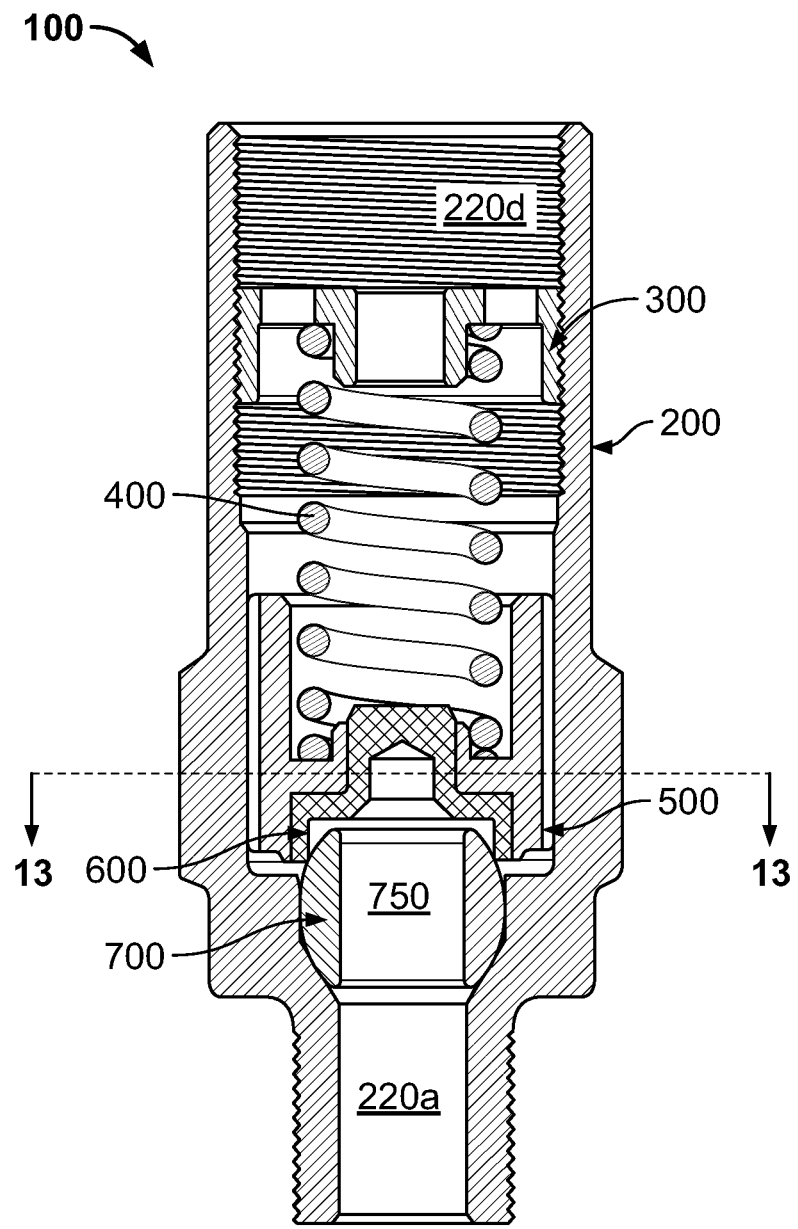
FIG. 12A is a cross-sectional side view of another embodiment of the pressure-relief valve of the present disclosure taken along line 12A-12A of FIG. 13, showing the pressure-relief valve in the closed configuration.
Figure 12B:
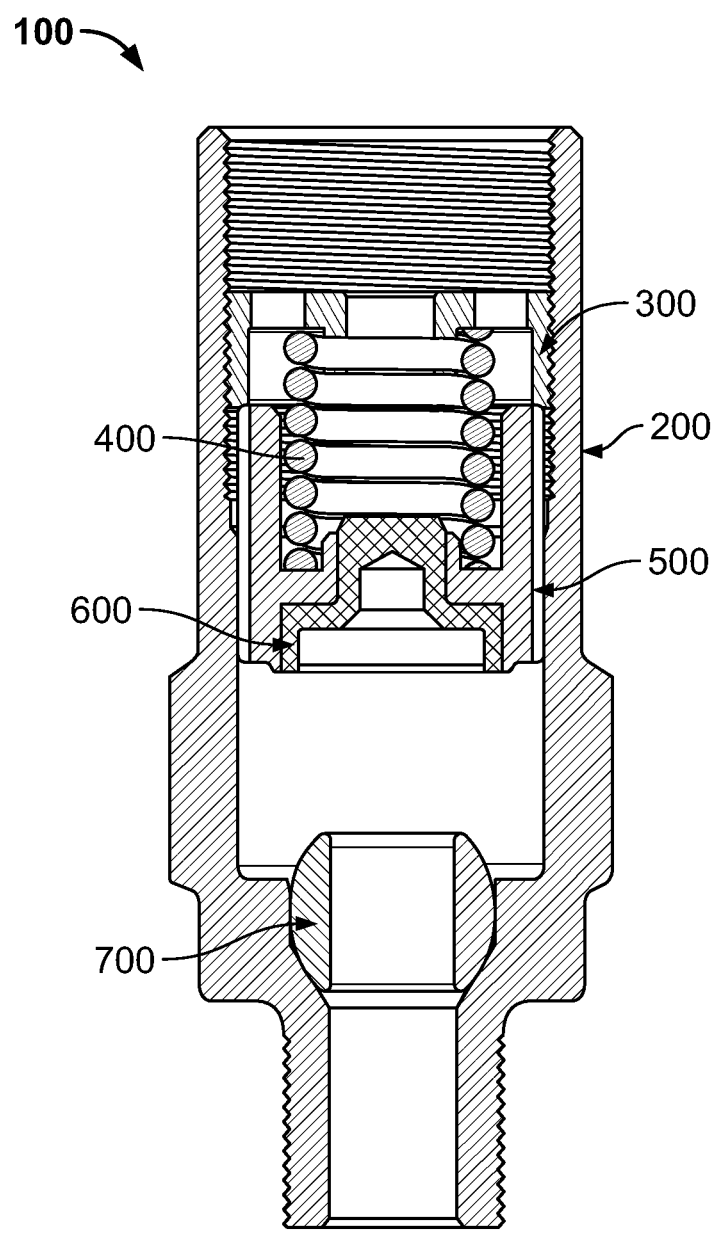
FIG. 12B is a cross-sectional side view of the pressure-relief valve of FIG. 12A, showing the pressure-relief valve in the open configuration.

As best shown in FIGS. 12A and 12B, the body 200 houses the set screw 300, the spring 400, the piston 500, the seat disc 600, and the valve seat 700. The body 200 is identical to the body 20. The element numbers used below to describe the body 200 are identical to the corresponding numbers used above to describe the body 20 with an additional "0" appended at the end (e.g., 21e becomes 210e, 22a becomes 220a, and the like). Similarly, the valve seat 700 is identical to the valve seat 70. The element numbers used below to describe the valve seat 700 are identical to the corresponding numbers used above to describe the valve seat 70 with an additional "0" appended at the end (e.g., 72 becomes 720, 75 becomes 750, and the like).

Figure 18:
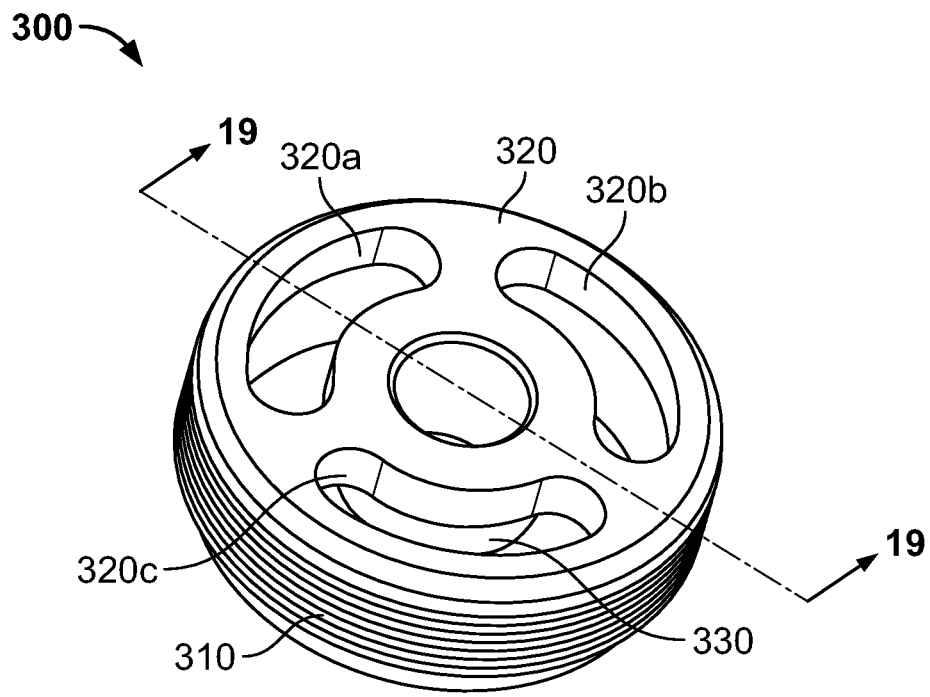
FIG. 18 is an isometric view of the set screw of the pressure-relief valve of FIG. 12A.
Figure 19:
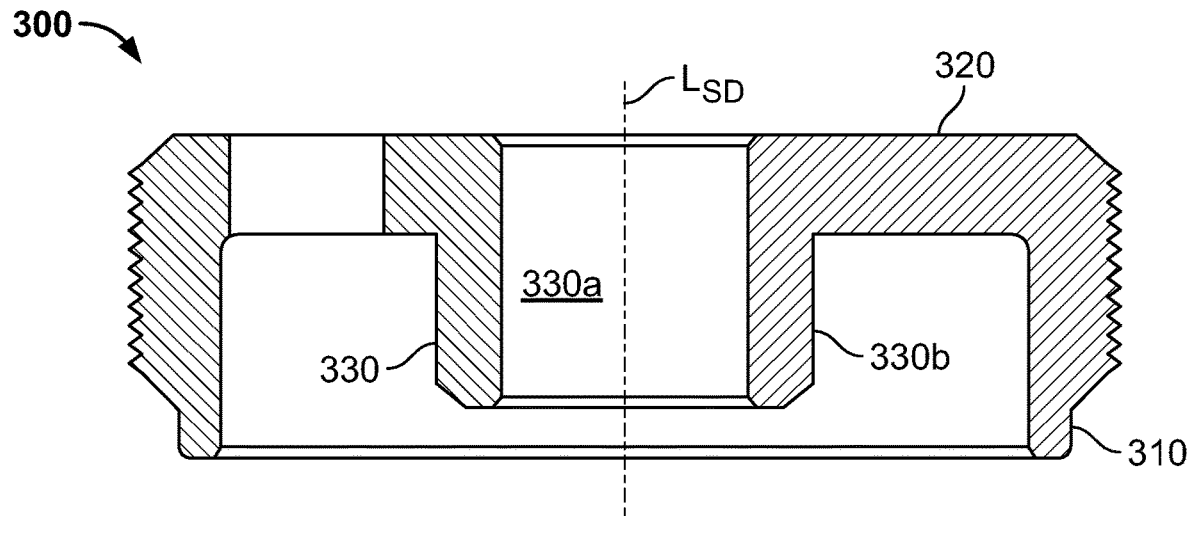
FIG. 19 is a cross-sectional side view of the set screw of FIG. 18 taken along line 19-19 of FIG. 18.

As best shown in FIGS. 18 and 19, the set screw 300 includes a body including a tubular outer wall 310, a generally circular upper wall 320, and a tubular inner wall 330. The tubular outer wall 310 is externally threaded and configured to threadably engage the threads of the sixth inner surface 210f of the body 200. The upper wall 320 includes multiple surfaces 320a, 320b, and 320c that each define a kidney shaped opening through the upper wall 320. The inner wall 330 includes a cylindrical inner surface 330a that defines a bore and a cylindrical outer surface 330b. The outer surface 330b has a diameter just smaller than the inner diameter of the spring 400. As best shown in FIGS. 12A and 12B, the inner wall 330 is received in an inner cavity of the spring 400 such that the spring 400 is partially disposed around the inner wall 330 and contacts (or is slightly spaced apart from) the outer surface 330b. This reduces or prevents radial movement of the spring 400 and retains it in place.

Figure 14:
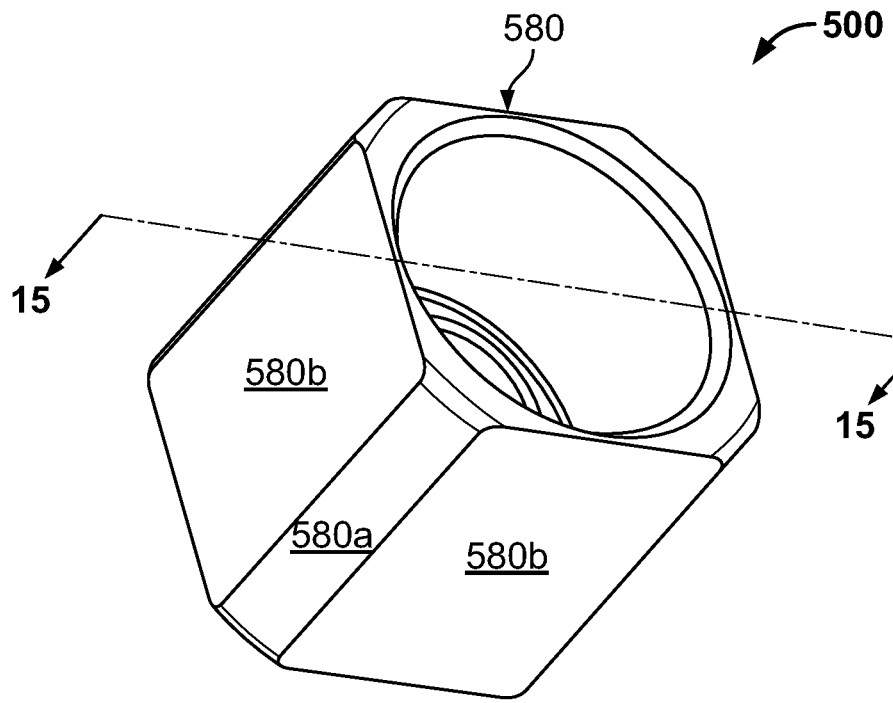
FIG. 14 is an isometric view of the piston of the pressure-relief valve of FIG. 12A.
Figure 15:
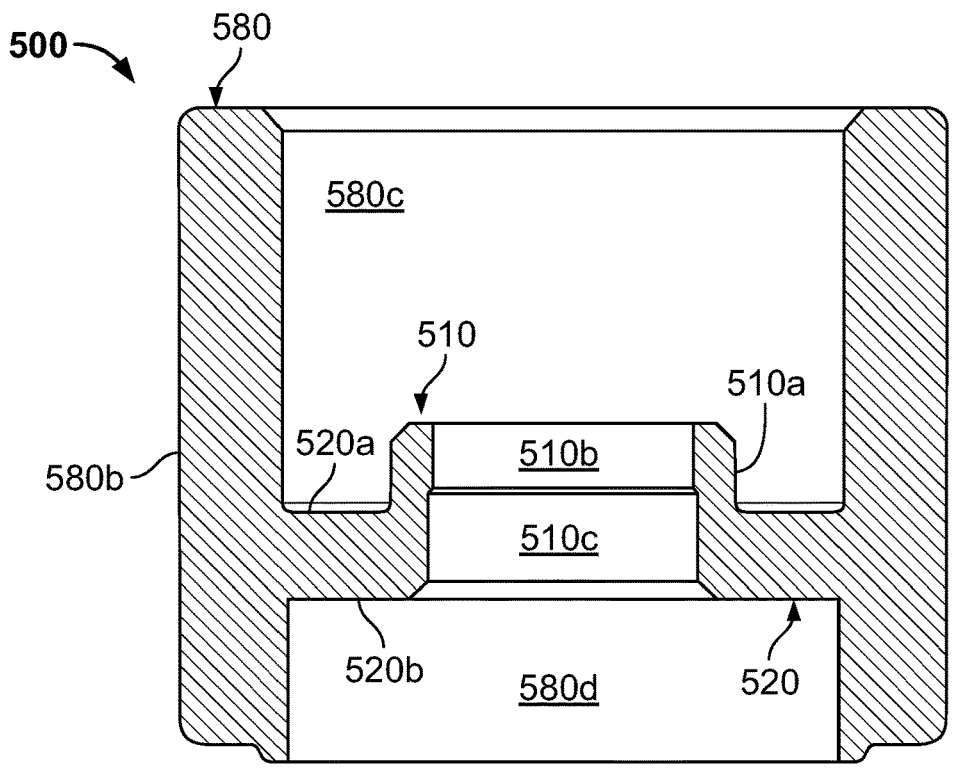
FIG. 15 is a cross-sectional side view of the piston of FIG. 14 taken along line 15-15 of FIG. 14.

As best shown in FIGS. 14 and 15, the piston 500 includes a body including a tubular outer wall 580, a tubular inner wall 510, and an annular connecting wall 520 extending between and connecting the inner and outer walls 510 and 580.

The outer wall 580 has a box-shaped exterior formed from four body-guide surfaces 580a and four connecting surfaces 580b. Each connecting surface 580b extends between two different body-guide surfaces 580a. The outer wall 580 has cylindrical inner surfaces 580c and 580d. The inner wall 510 includes a cylindrical outer surface 510a and cylindrical inner surfaces 510b and 510c. The connecting wall 520 includes an annular upper surface 520a joining the inner surface 580c of the outer wall 580 with the outer surface 510a of the inner wall 510. The connecting wall 520 also includes an annular lower surface 520b joining the inner surface 580d of the outer wall 580 with the inner surface 510c of the inner wall 510.

The inner surfaces 510b and 510c of the inner wall 510 generally define a seat disc receiving bore (not labeled) sized and shaped to receive and retain part of the seat disc 600 (described below). Also, the lower surface 520b of the connecting wall 520 and the inner surface 580d of the outer wall 580 generally define a seat disc receiving void (not labeled) sized and shaped to receive and retain another part of the seat disc 600, as described below.

The inner surface 580c of the outer wall 580, the upper surface 520a of the connecting wall 520, and the outer surface 510a of the inner wall 510 generally define a spring receiving void (not labeled) sized and shaped to receive the spring 400. Also, the diameter of the outer surface 510a of the inner wall 510 is just smaller than the inner diameter of the spring 400. As best shown in FIGS. 12A and 12B, the inner wall 510 is received in an inner cavity of the spring 400 such that the spring 400 is partially disposed around the inner wall 510 and contacts (or is slightly spaced apart from) the outer surface 510a. This reduces or prevents radial movement of the spring 400 and retains it in place (along with the inner wall 330 of the seat disc 600).

Figure 13:
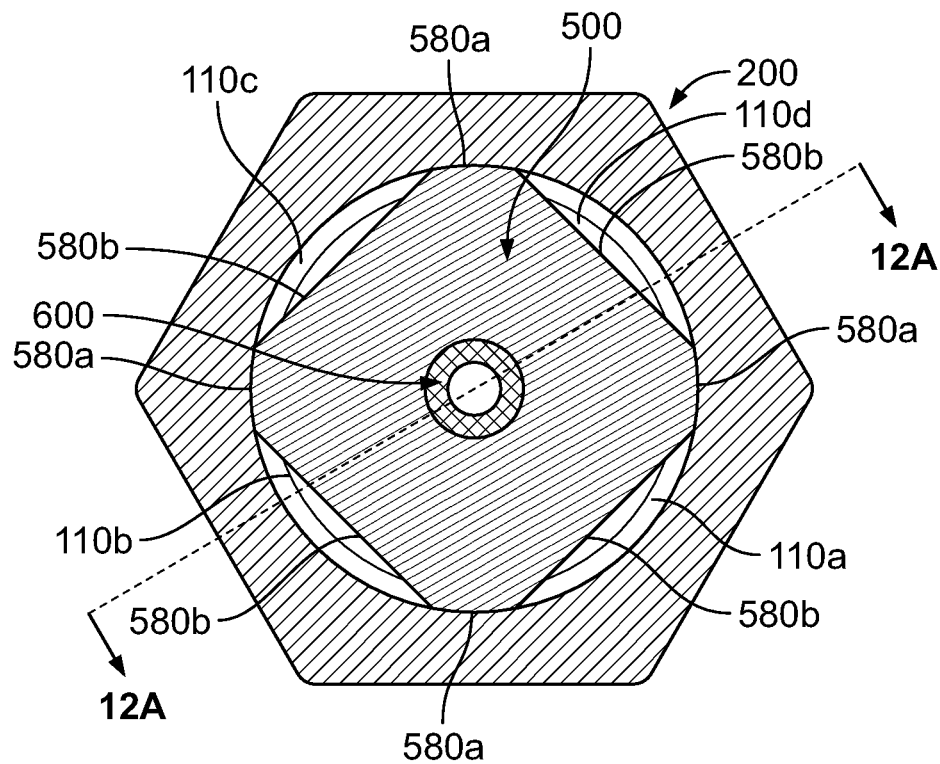
FIG. 13 is a cross-sectional top view of the pressure-relief valve of FIG. 12A taken along line 13-13 of FIG. 12A.

The piston 500 is preferably symmetrical about a plane extending through opposing body-guide surfaces 580a. The piston 500 is sized and shaped to be received in the void 220d formed in the body 200. As best shown in FIG. 13, when the piston 500 is received in the body 200, the body-guide surfaces 580a position the piston 500 within the body 200 to define a small clearance between the piston 500 and the inner wall 210e of the body 200. In this embodiment, the body-guide surfaces 580a have radii of curvature equal to the radius of curvature of the inner wall 210e of the body 200. This small clearance and equal radii of curvature between the body-guide surfaces 580a and inner wall 210e forms multiple partially cylindrical gaps 110a, 110b, 110c, and 110d between the body-guide surfaces 580a and the fifth inner surface 210e of the body 200.

The presence of the gaps 110a-110d between the body 200 and the piston 500 advantageously discourages foreign particles (e.g., dust) from accumulating on the inner surface 210e of the body 200 and thus obstructing longitudinal movement of the piston 500. More specifically, the presence of the gaps 110a-110d encourages particles entering the valve 100 via the valve outlet 220d to fall downward through the gaps 110a-110d and past the inner surface 210e, until reaching the fourth inner surface 210d of the body 200. Additionally, the gaps 110a-110d advantageously allow debris from the pressurized vessel (e.g., storage tank) to flow through the valve 100 instead of accumulating within the body 200.

Additionally, the body-guide surfaces 580a are configured to align the piston 500 with respect to the body 200 by circumferentially guiding the piston 500 adjacently along the fifth inner surface 210e of the body 200. By aligning the piston 500 with respect to the body 200, the body-guide surfaces 580a align the spring 400 with respect to the body 200 and the seat disc 600 with respect to the valve seat 700. Further, this alignment and guidance between the inner surface 210e of the body 200 and the body-guide surfaces 580a discourage the piston 500 from shaking and rattling inside the body 200. According to some embodiments, the piston 500 is configured to be adjacently positioned with respect to the body 200 (via the body-guide surfaces 580a) along an entire longitudinal length of the piston 500 to prevent any other portion of the piston 500 from radially colliding with the body 200.

Figure 16:
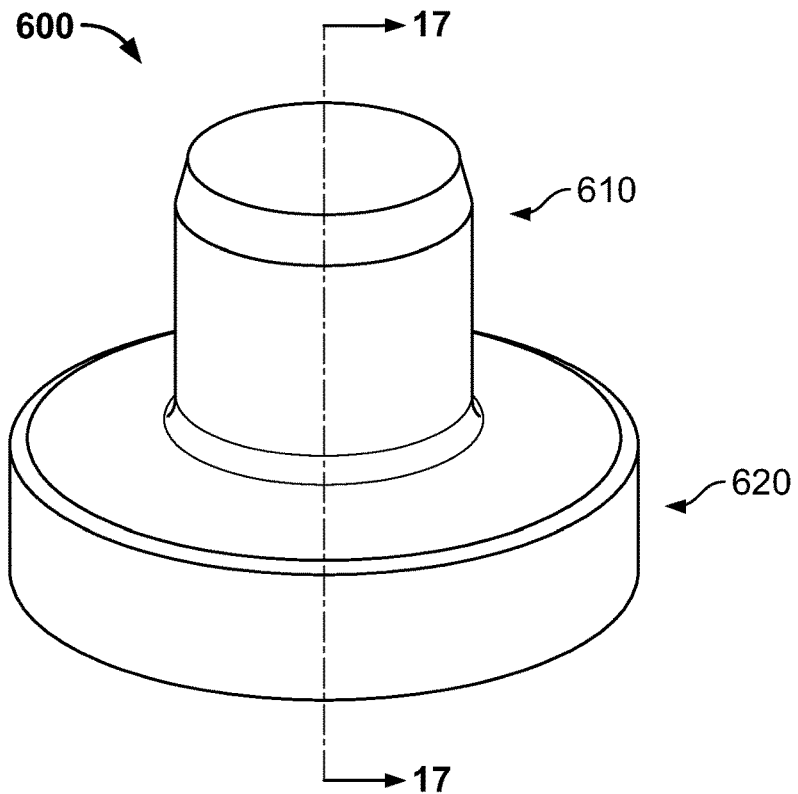
FIG. 16 is an isometric view of the seat disc of the pressure-relief valve of FIG. 12A.
Figure 17:
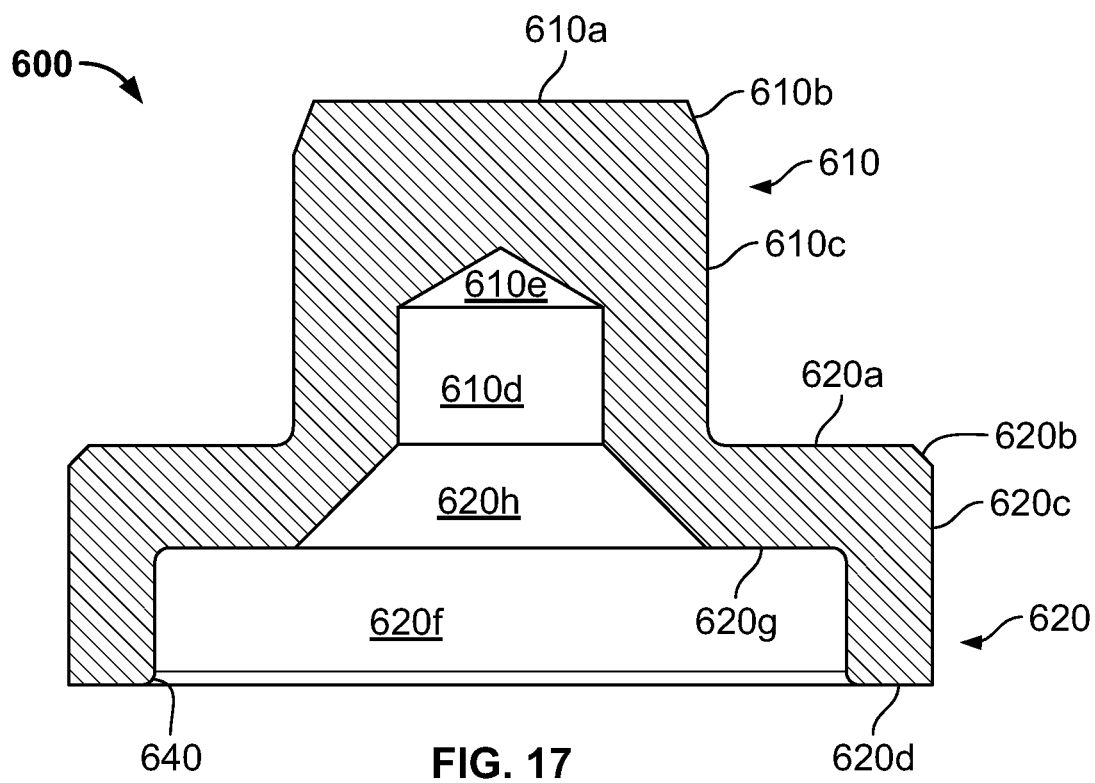
FIG. 17 is a cross-sectional side view of the seat disc of FIG. 16 taken along line 17-17 of FIG. 16.

Turning to FIGS. 16 and 17, the seat disc 600 includes a body (not labeled) having a seat disc head (or first portion) 610 extending from a seat disc body (or second) portion 620. The seat disc head 610 includes an exterior formed from a circular first surface 610a, a tapered annular second surface 610b extending from the first surface 610a, and a cylindrical third surface 610c extending from the second surface 610b. The seat disc body 620 includes an exterior formed from an annular first surface 620a extending from the third surface 610c of the seat disc head 610, a tapered annular second surface 620b extending from the first surface 620a, a cylindrical third surface 620c extending from the second surface 620b, and an annular fourth surface 620d extending from the third surface 620c. The body defines a nipple-shaped void formed by a cylindrical surface 620f, an annular surface 620g extending from the surface 620f, a tapered annular surface 620h extending from the surface 620g, a cylindrical surface 610d extending from the surface 620h, and a conical surface 610e extending from the surface 610d. The seat disc 600 is symmetrical about its longitudinal axis.

Figure 20:
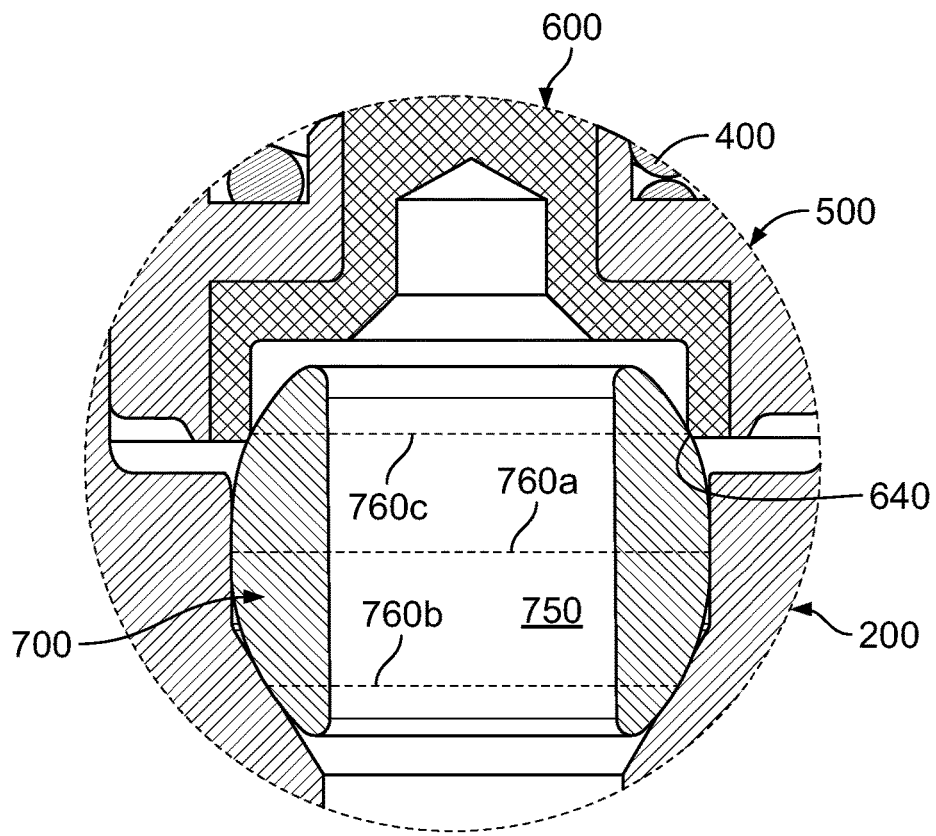
FIG. 20 is a fragmentary cross-sectional side view of the pressure-relief valve of FIG. 12A showing the valve seat, a portion of the body, and a portion of the seat disc taken along line 12A-12A of FIG. 13.

As best shown in FIGS. 12A, 12B, and 20, the seat disc 600 is received and held by the piston 500 via interference fit. Specifically, the seat disc head 610 is received in and extends through the seat disc receiving bore generally defined by the inner surfaces 510b and 510c of the inner wall 510 of the piston 500 and the seat disc body 620 is received in the seat disc receiving void generally defined by the lower surface 520b of the connecting wall 520 and the inner surface 580d of the outer wall 580 of the piston 500. The diameter of the seat disc receiving bore is slightly smaller than the diameter of the seat disc head 610, and the diameter of the seat disc receiving void is slightly smaller than the diameter of the seat disc body 620. This enables the piston 500 to retain the seat disc 600 in those voids via an interference fit such that the piston 500 and the seat disc 600 move as one.

The seat disc 600 also includes a circumferentially extending sealing surface 640 between the surfaces 620d and 620f. The sealing surface 640 is configured to compress against the valve seat 700, as described below. More specifically, at least a portion of sealing surface 640 sealingly engages the valve seat 700 along a circumference 760c when valve 100 is closed, as shown in FIG. 20.

More specifically, the piston 500 and attached seat disc 600 are movable between a sealed position (i.e., closed position) (FIG. 12A) and an unsealed position (i.e., open position) (FIG. 12B). When the piston 500 and attached seat disc 600 are in the sealed position, the sealing surface 640 of the seat disc 600 sealingly engages the valve seat 700 to prevent fluid from flowing through the valve 100 from the inlet void 220a to the outlet void 220d and the valve 100 therefore is closed. On the other hand, when the piston 500 and attached seat disc 600 are in the unsealed position, the sealing surface 640 of the seat disc 600 is displaced from—and does not sealingly engage—the valve seat 700, meaning that fluid can flow through the valve 100 from the inlet void 220a to the outlet void 220d. The spring 400 biases the piston 500 and the seat disc 600 to the sealed position, and the valve 100 is therefore biased in the closed and/or sealed position.

In operation, the valve 100 is attached to a pressurized vessel (e.g., a tank or conduit, not shown) storing a pressurized fluid via the threading on the first outer surface 230a of the body 200 such that the inlet void 220a is in constant fluid communication with the pressurized vessel. The pressurized fluid may be stored in the vessel at cryogenic temperatures. The outlet void 220d is configured to be in constant fluid communication with ambient atmosphere.

The inlet void 220a is in constant fluid communication with the valve seat void 750. Pressurized fluid in valve seat void 750 acts against the biasing force the spring 400 imposes against the piston 500 and the seat disc 600. When the pressurized fluid in the vessel exceeds a threshold pressure, and specifically when the force the pressurized fluid imposes on the seat disc 600 exceeds the biasing force of the spring 400, the seat disc 600 disengages the valve seat 700 and moves from the sealed position to the unsealed position. This opens the valve 100 and enables fluid to flow from valve seat void 750 through the gaps 110a-110d between the body 200 and the piston 500 and through the openings in the set screw 300 into the outlet void 220d and then to ambient atmosphere.

Upon sufficient fluid venting, the force the pressurized fluid imposes on the seat disc 600 falls below the biasing force imposed by the spring 400. As a result, the spring 400 forces the piston 500 and attached seat disc 600 to the sealed position, thereby closing the valve 100.

Figure 21A:
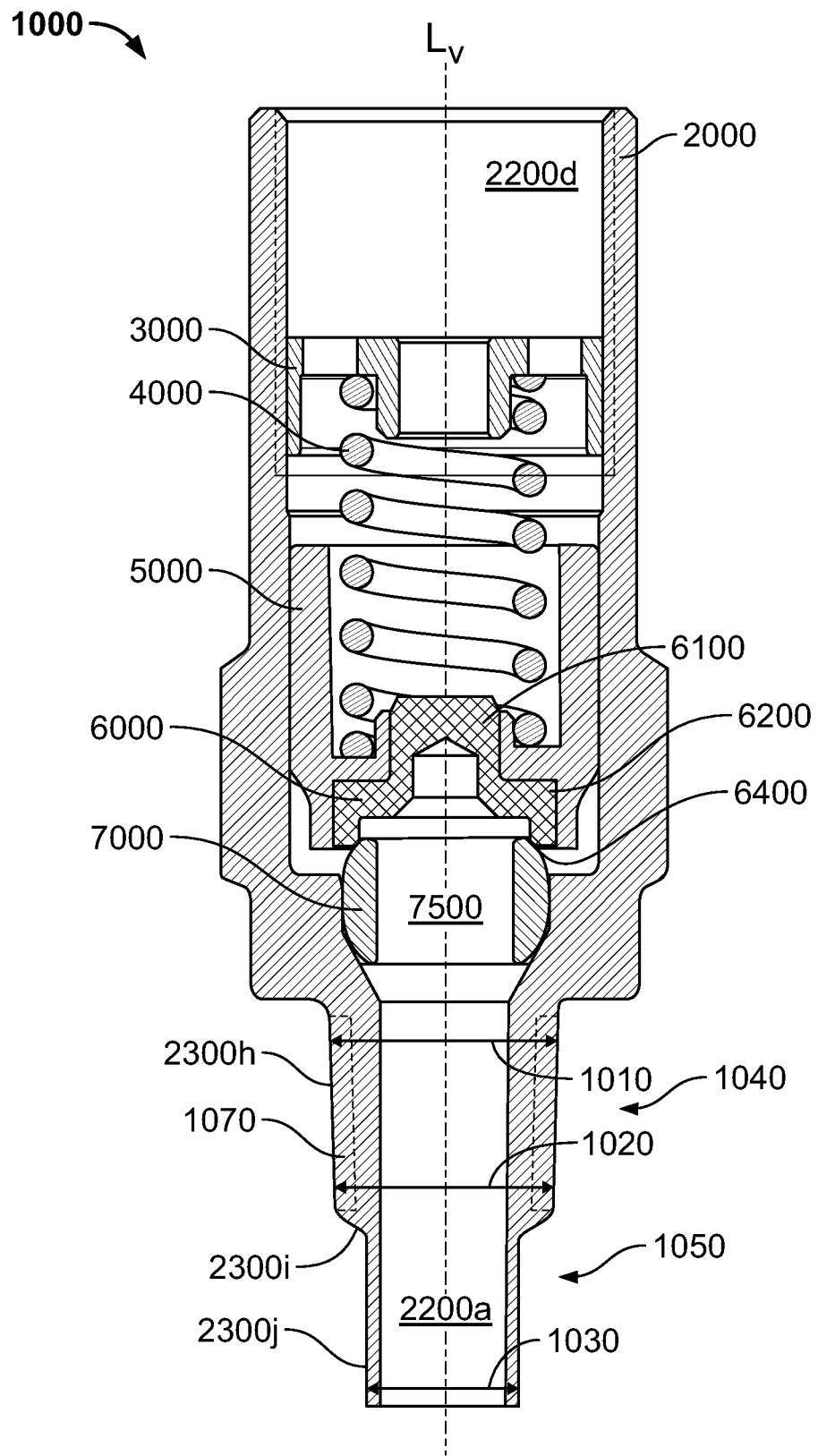
FIG. 21A is a cross-sectional side view of another embodiment of the pressure-relief valve of the present disclosure, showing the pressure-relief valve in the closed configuration.
Figure 21B:
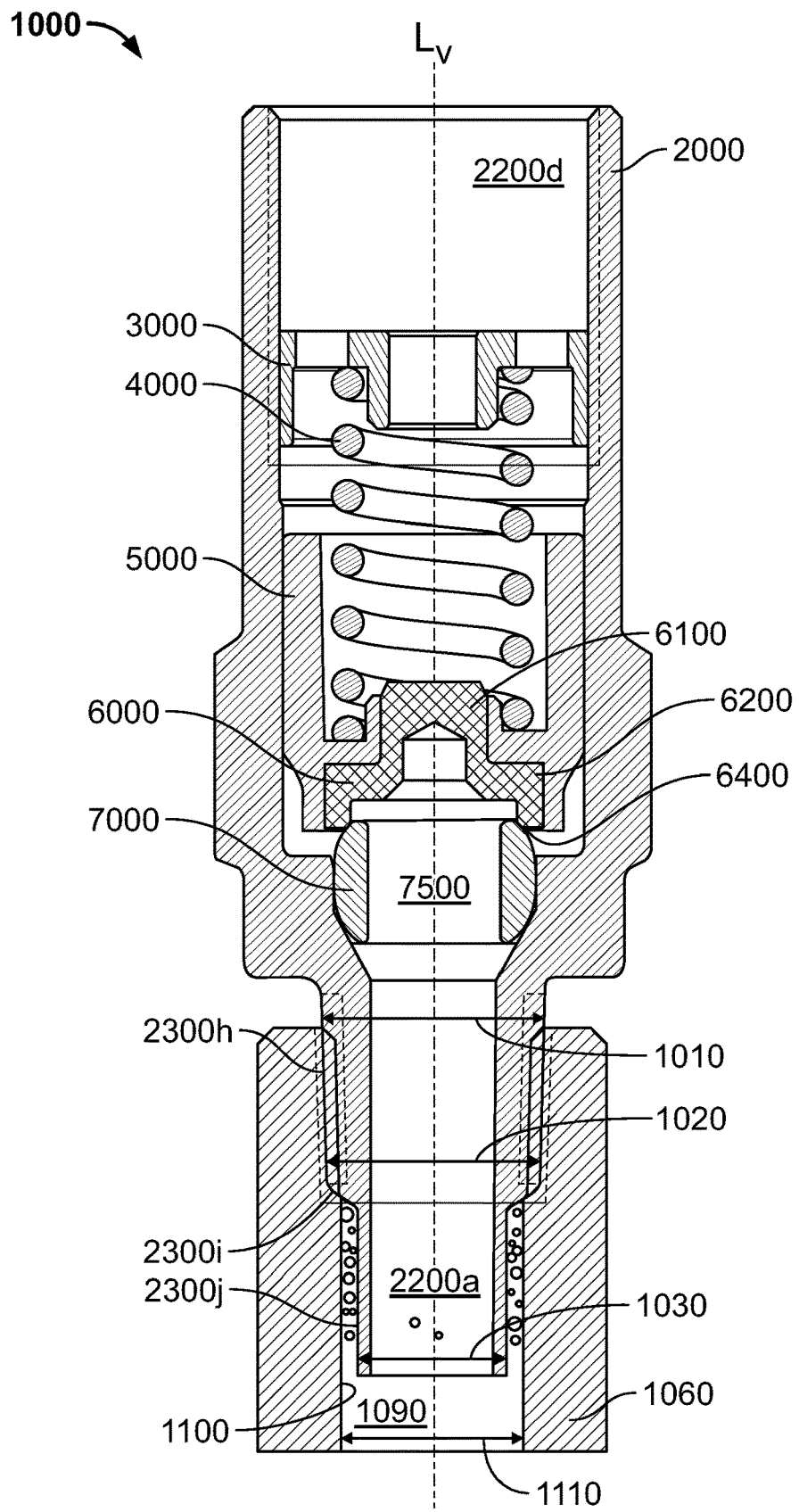
FIG. 21B is a cross-sectional side view of the pressure-relief valve of FIG. 21A showing the valve coupled to a conduit.

FIGS. 21A and 21B illustrate another embodiment of the pressure-relief valve of the present disclosure, identified as the pressure-relief valve 1000. The pressure-relief valve 1000 includes a body 2000, a set screw 3000, a spring 4000, a piston 5000, a seat disc 6000, and a valve seat 7000.

As best shown in FIGS. 21A and 21B the body 2000 houses the set screw 3000, the spring 4000, the piston 5000, the seat disc 6000, and the valve seat 7000. The body 2000 is preferably substantially identical to the body 200, unless where differences are noted and discussed in further detail below. Accordingly, most of the element numbers used below to describe the body 2000 are identical to the corresponding numbers used above to describe the body 200 with an additional "0" appended at the end (e.g., 210e becomes 2100e, 220a becomes 2200a, and the like). Similarly, the valve seat 7000 is preferably substantially identical to the valve seat 700. The element numbers used below to describe the valve seat 7000 are identical to the corresponding numbers used above to describe the valve seat 700 with an additional "0" appended at the end (e.g., 720 becomes 7200, 750 becomes 7500, and the like).

As best shown in FIGS. 21A and 21B, the seat disc 6000 is received and held by the piston 5000 via interference fit. Specifically, the seat disc head 6100 is received in and extends through the seat disc receiving bore generally defined by the inner surfaces of the inner wall (e.g., inner surfaces 510b and 510c of inner wall 510 of FIG. 15) of the piston 5000 and the seat disc body 6200 is received in the seat disc receiving void generally defined by the lower surface of the connecting wall and the inner surface of the outer wall (e.g., lower surface 520b, connecting wall 520, inner surface 580d, and outer wall 580 of FIG. 15) of the piston 5000. The diameter of the seat disc receiving bore is slightly smaller than the diameter of the seat disc head 6100, and the diameter of the seat disc receiving void is slightly smaller than the diameter of the seat disc body 6200. This enables the piston 5000 to retain the seat disc 6000 in those voids via an interference fit such that the piston 5000 and the seat disc 6000 move as one.

The seat disc 6000 also includes a circumferentially extending sealing surface 6400 between the surfaces (e.g., surfaces 620d and 620f of FIG. 17). The sealing surface 6400 is configured to compress against the valve seat 7000, as described below. More specifically, at least a portion of sealing surface 6400 sealingly engages the valve seat 7000 along a circumference (e.g., circumference 760c of FIG. 20) when valve 1000 is closed.

More specifically, the piston 5000 and attached seat disc 6000 are movable between a sealed and/or closed position (e.g., FIGS. 12A, 21A, 21B) and an unsealed and/or open position (e.g., FIG. 12B). When the piston 5000 and attached seat disc 6000 are in the sealed position, the sealing surface 6400 of the seat disc 6000 sealingly engages the valve seat 7000 to prevent fluid from flowing through the valve 1000 from the inlet void 2200a to the outlet void 2200d and the valve 1000 therefore is closed. On the other hand, when the piston 5000 and attached seat disc 6000 are in the unsealed position, the sealing surface 6400 of the seat disc 6000 is displaced from—and does not sealingly engage—the valve seat 7000, meaning that fluid can flow through the valve 1000 from the inlet void 2200a to the outlet void 2200d. The spring 4000 biases the piston 5000 and the seat disc 6000 to the sealed position, and the valve 1000 is therefore biased in the closed and/or sealed position.

As best shown in FIGS. 21A and 21B, the body 2000 has an eighth outer surface 2300h that tapers at a slight angle with respect to the longitudinal axis $L_V$, depending on the threaded connection being used. The eighth outer surface 2300h has a first outer diameter 1010 and a second outer diameter 1020 that is smaller than the first outer diameter 1010 to define a taper of the eighth outer surface 2300h. The body 2000 further has a ninth outer surface 2300i at an angle (e.g., 45 degrees) with respect to the longitudinal axis $L_V$, and a tenth outer surface 2300j that is parallel with respect to the longitudinal axis $L_V$. The tenth outer surface 2300j has an outer diameter 1030 that is smaller than each of the first outer diameter 1010 and the second outer diameter 1020 of the eighth outer surface 2300h of the body 2000.

In the illustrated example, the ninth outer surface 2300i slopes inwardly at an angle (e.g., 45 degrees) towards the longitudinal axis $L_V$ to connect the eighth outer surface 2300h and the tenth outer surface 2300j. As such, the eighth outer surface 2300h, the ninth outer surface 2300i, and the tenth outer surface 2300j define one or more tapered portions of the outer surface 2300 of the body 2000. For example, a first tapered portion 1040 (i.e., first portion) is formed along the eighth outer surface 2300h and a second tapered portion 1050 (i.e., second portion) is formed along the ninth outer surface 2300i and the tenth outer surface 2300j. In some examples, the amount of taper in the second tapered potion 1060 is defined by the angle which the ninth outer surface 2300i slopes to connect the eighth outer surface 2300h to the tenth outer surface 2300j. As illustrated in FIGS. 21A and 21B, the ninth outer surface 2300i slopes towards the longitudinal axis $L_V$ such that a diameter (e.g., first outer diameter 1010) of the first tapered portion 1040 is larger than a diameter (e.g., outer diameter 1020) of the second tapered portion. Such tapering may be modified or eliminated and is not critical to the operation of the apparatus disclosed herein.

In operation, the valve 1000 is attached to a pressurized vessel (not shown) storing a pressurized fluid via a conduit 1060. In one non-limiting example, the body 2000 includes a set of threads 1070 configured to threadably engage a corresponding set of threads 1080 on the conduit 1060 to removably couple the body 2000 to the conduit 1060. The conduit 1060 further includes a conduit void 1090 including an inner surface 1100 which defines an inner diameter 1110 of the conduit 1060. Accordingly, in some examples, the inner surface 1100 of the conduit 1060 is sealingly engaged with the eighth outer surface 2300h of the body 2000 when the threads 1070 of the body 2000 are threaded into the corresponding threads 1080 of the conduit. While FIGS. 21A and 21B show the use of threads to removably couple the body 2000 to the conduit 1060, it will be understood that the valve 1000 may be coupled to the conduit 1060 using other coupling mechanisms such as, an interference fit, a compression fit, and/or other such coupling mechanisms.

As illustrated in FIG. 21B, the inner diameter 1110 of the conduit is larger than the outer diameter 1030 of the tenth outer surface 2300j of the body 2000. Thus, when the body 2000 is sealingly engaged with the conduit 1060 a circumferential void 1120 is defined between the ninth outer surface 2300i and the tenth outer surface 2300j of the body 2000 and the inner surface 1100 of the conduit 1060. Furthermore, during operation the conduit void 1090 is in constant fluid communication with the inlet void 2200a and the valve seat void 7500. Pressurized fluid that enters the valve seat void 7500, via the conduit void 1090 and the inlet void 2200a, acts against the biasing force the spring 4000 imposes against the piston 5000 and the seat disc 6000. The presence of the circumferential void 1100 advantageously collects particles (e.g., dust) and other such debris present in the pressurized fluid within the conduit 1060. More specifically, the circumferential void 1100 collects particles and other such debris from entering the inlet 2200a and accumulating on the internal surfaces and components of the valve 1000.

When the pressurized fluid in the vessel exceeds a threshold pressure, and specifically when the force the pressurized fluid imposes on the seat disc 6000 exceeds the biasing force of the spring 4000, the seat disc 6000 disengages the valve seat 7000 and moves from the sealed position (e.g. FIGS. 21A and 21B) to the unsealed position (e.g., FIG. 12B). This opens the valve 1000 and enables fluid to flow from valve seat void 7500 through the gaps (e.g., gaps 110a-110d of FIG. 13) between the body 2000 and the piston 5000 and through the openings in the set screw 3000 into the outlet void 2200d and then to ambient atmosphere.

Upon sufficient fluid venting, the force the pressurized fluid imposes on the seat disc 6000 falls below the biasing force imposed by the spring 4000. As a result, the spring 4000 forces the piston 5000 and attached seat disc 6000 to the sealed position, thereby closing the valve 1000.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

Various embodiments of a valve of the present disclosure for conveying fluid has a closed position and an open position and comprises a body, a valve seat disposed in the body, a holder disposed in the body, and a valve seat disc. The valve seat comprises one or more inner surfaces and an outer surface, and the one or more inner surfaces define an inner void. The valve seat disc is connected to and movable with the holder between a first position in which the valve seat disc sealingly engages the outer surface of the valve seat and a second position in which the valve seat disc is disengaged from the outer surface of the valve seat. The valve is in the closed position when the valve seat disc is in the first position and the valve is in the open position when the valve seat disc is in the second position.

In one such embodiment, the valve further comprises a spring biasing the valve seat disc toward the second position.

In another such embodiment, the holder defines a second inner void in which at least a portion of the spring is received.

In another such embodiment, the holder defines a first opening and a second opening.

In another such embodiment, the first opening is disposed below the second opening with respect to a longitudinal axis of the body.

In another such embodiment, the first and second openings have different geometries.

In another such embodiment, a gap is formed between the holder and the body such that when the valve is in the open position, the gap is in fluid communication with the inner void of the valve seat, the first opening, and the second opening.

In another such embodiment, the holder comprises a plurality of body-guiding surfaces that guide the holder with respect to the body.

In another such embodiment, each body-guiding surface includes a radius of curvature.

In another such embodiment, a plurality of gaps are defined between the holder and the body, each of the plurality of gaps being disposed between two consecutive body-guiding surfaces. When the valve is in the open position, the plurality of gaps are in fluid communication with the inner void of the valve seat.

In another such embodiment, wherein the valve seat guides one or more inner surfaces of the body.

In another such embodiment, the body is made from a first material and the valve seat is made from a different second material. The first material of the body includes a greater coefficient of thermal expansion than the second material of the valve seat.

In another such embodiment, the body and the valve seat are configured such that the body radially inwardly compresses the valve seat to a greater extent as the temperature approaches cryogenic temperature.

In another such embodiment, the valve seat disc comprises one or more outer surfaces and one or more inner surfaces, the one or more inner surfaces defining an inner void of the valve seat disc.

In another such embodiment, when the valve seat disc is in the first position, the valve seat at least partially extends into the inner void of the valve seat disc.

In another such embodiment, when the valve seat disc is in the first position, at least one of the one or more inner surfaces of the valve seat disc contacts the outer surface of the valve seat.

In another such embodiment, the valve is configured to have one or more closed positions and one or more open positions, the one or more closed positions comprising the closed position, and the one or more open positions comprising the open position. The valve seat disc is configured to have a plurality of positions, the plurality of positions comprising the first position and the second position.

In another such embodiment, the holder defines a first inner void and a plurality of undercuts at least partially surrounding a perimeter of the first inner void. The plurality of undercuts deformably compress the valve seat disc to secure the valve seat disc in the first inner void.

In another such embodiment, the valve further comprises a spring biasing the valve seat disc toward the second position. The holder comprises a first spring-retaining wall around which the spring is partially disposed.

In another such embodiment, the valve further comprises a set screw comprising a second spring-retaining wall around which the spring is partially disposed such that the spring extends between the set screw and the holder.

In another such embodiment, the valve further comprises a tapered portion defined in the body. The tapered portion circumferentially surrounds an inlet of the body.

In another such embodiment, the tapered portion includes a first portion having a first diameter and a second portion having a second diameter smaller than the first tapered portion diameter.

In another such embodiment, the holder includes an outer wall, an inner wall, and an annular connecting wall extending between and connected to each of the outer wall and the inner wall.

In another such embodiment, the outer wall, the inner wall, and the annular connecting wall of the holder define a receiving bore and a receiving void configured to receive and retain the valve seat disc.

In another such embodiment, the valve seat disc includes a seat disc body and a seat disc head extending from the seat disc body. The seat disc body is received in the receiving void and the seat disc head extends through the receiving bore.

In another such embodiment, the receiving void receives the seat disc body and the receiving bore retains the seat disc head via an interference fit.

What is claimed is:

1. A valve for conveying fluid, the valve having a closed position and an open position and comprising:
    a body;
    a valve seat disposed in the body, the valve seat comprising one or more inner surfaces and an outer surface, the one or more inner surfaces defining an inner void, wherein the valve seat contacts one or more inner surfaces of the body, wherein the body is made from a first material and the valve seat is made from a different second material, and wherein the first material of the body includes a greater coefficient of thermal expansion than the second material of the valve seat;
    a holder disposed in the body; and
    a valve seat disc connected to and movable with the holder between a first position in which the valve seat disc sealingly engages the outer surface of the valve seat and a second position in which the valve seat disc is disengaged from the outer surface of the valve seat,
    wherein the valve is in the closed position when the valve seat disc is in the first position and the valve is in the open position when the valve seat disc is in the second position.

2. The valve of claim 1, further comprising a spring biasing the valve seat disc toward the first position.

3. The valve of claim 2, wherein the holder defines a second inner void in which at least a portion of the spring is received.

4. The valve of claim 1, wherein the holder comprises a plurality of body-guiding surfaces that guide the holder with respect to the body.

5. The valve of claim 4, wherein each body-guiding surface includes a radius of curvature.

6. The valve of claim 4, wherein a plurality of gaps are defined between the holder and the body, each of the plurality of gaps being disposed between two consecutive body-guiding surfaces; and wherein when the valve is in the open position, the plurality of gaps are in fluid communication with the inner void of the valve seat.

7. The valve of claim 1, wherein the body and the valve seat are configured such that the body radially inwardly compresses the valve seat to a greater extent as the temperature approaches cryogenic temperature.

8. The valve of claim 1, wherein the valve seat disc comprises one or more outer surfaces and one or more inner surfaces, the one or more inner surfaces defining an inner void of the valve seat disc.

9. The valve of claim 8, wherein when the valve seat disc is in the first position, the valve seat at least partially extends into the inner void of the valve seat disc.

10. The valve of claim 9, wherein when the valve seat disc is in the first position, at least one of the one or more inner surfaces of the valve seat disc contacts the outer surface of the valve seat.

11. The valve of claim 1, wherein the valve is configured to have one or more closed positions and one or more open positions, the one or more closed positions comprising the closed position, and the one or more open positions comprising the open position; and
    wherein the valve seat disc is configured to have a plurality of positions, the plurality of positions comprising the first position and the second position.

12. The valve of claim 1, further comprising a spring biasing the valve seat disc toward the first position, wherein the holder comprises a first spring-retaining wall around which the spring is partially disposed.

13. The valve of claim 12, further comprising a set screw comprising a second spring-retaining wall around which the spring is partially disposed such that the spring extends between the set screw and the holder.

14. The valve of claim 1, further comprising a tapered portion defined in the body, wherein the tapered portion circumferentially surrounds an inlet of the body.

15. A valve for conveying fluid, the valve having a closed position and an open position and comprising:
    a body;
    a valve seat disposed in the body, the valve seat comprising one or more inner surfaces and an outer surface, the one or more inner surfaces defining an inner void;
    a holder disposed in the body, wherein the holder includes an outer wall, an inner wall, and an annular connecting wall extending between and connected to each of the outer wall and the inner wall; and
    a valve seat disc connected to and movable with the holder between a first position in which the valve seat disc sealingly engages the outer surface of the valve seat and a second position in which the valve seat disc is disengaged from the outer surface of the valve seat,
    wherein the outer wall, the inner wall and the annular connecting wall of the holder define a receiving bore and a receiving void configured to receive and retain the valve seat disc,
    wherein the valve seat disc includes a seat disc body and a seat disc head extending from the seat disc body, and wherein the seat disc body is received in the receiving void and the seat disc head extends through the receiving bore, and
    wherein the valve is in the closed position when the valve seat disc is in the first position and the valve is in the open position when the valve seat disc is in the second position.

16. The valve of claim 15, wherein the receiving void receives the seat disc body and the receiving bore retains the seat disc head via an interference fit.

\* \* \* \* \*

UNITED STATES PATENT AND TRADEMARK OFFICE
CERTIFICATE OF CORRECTION

| | | |
|---|---|---|
| PATENT NO. | : 12,044,324 B2 | Page 1 of 1 |
| APPLICATION NO. | : 17/675712 | |
| DATED | : July 23, 2024 | |
| INVENTOR(S) | : Guangbin Cao et al. | |

It is certified that error appears in the above-identified patent and that said Letters Patent is hereby corrected as shown below:

In the Specification

Column 6, Line 52, "The outer" should be changed to --the outer--.

Column 6, Line 60, "Lys." should be changed to --$L_{VS}$.--.

Signed and Sealed this
Seventh Day of January, 2025

Derrick Brent
*Acting Director of the United States Patent and Trademark Office*